United States Patent
Head et al.

(10) Patent No.: US 7,967,255 B2
(45) Date of Patent: Jun. 28, 2011

(54) AUTONOMOUS SPACE FLIGHT SYSTEM AND PLANETARY LANDER FOR EXECUTING A DISCRETE LANDING SEQUENCE TO REMOVE UNKNOWN NAVIGATION ERROR, PERFORM HAZARD AVOIDANCE AND RELOCATE THE LANDER AND METHOD

(75) Inventors: James N. Head, Tucson, AZ (US); Gregory V. Hoppa, Hampstead, NH (US); Thomas G. Gardner, Tucson, AZ (US); Karen I. Tsetsenekos, Tucson, AZ (US); Stephen M. Dolfini, Tucson, AZ (US); Tomas Svitek, San Luis Obispo, CA (US); Karleen G. Seybold, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 1048 days.

(21) Appl. No.: 11/782,407

(22) Filed: Jul. 24, 2007

(65) Prior Publication Data
US 2008/0023587 A1    Jan. 31, 2008

Related U.S. Application Data

(60) Provisional application No. 60/833,557, filed on Jul. 27, 2006.

(51) Int. Cl.
 *B64G 1/40* (2006.01)
(52) U.S. Cl. .................. 244/171.1; 244/158.8
(58) Field of Classification Search .............. 244/158.1, 244/158.4, 158.7, 158.5, 158.9, 169, 171.1, 244/171.2; 701/13, 23
See application file for complete search history.

(56) References Cited

U.S. PATENT DOCUMENTS

| | | | |
|---|---|---|---|
| 3,191,316 A * | 6/1965 | Dryden | 434/34 |
| 3,339,404 A * | 9/1967 | Brooks et al. | 73/84 |
| 6,227,494 B1 * | 5/2001 | Turner | 244/172.6 |
| 6,247,546 B1 | 6/2001 | Spletzer et al. | |
| 2004/0061028 A1 * | 4/2004 | Salvatore et al. | 244/172 |

OTHER PUBLICATIONS

Noor et al. Space Calls Mechanical Engineering. Nov. 2004.*

(Continued)

*Primary Examiner* — Tien Dinh
(74) *Attorney, Agent, or Firm* — Eric A. Gifford

(57) ABSTRACT

An autonomous unmanned space flight system and planetary lander executes a discrete landing sequence including performing an initial velocity braking maneuver to remove velocity at altitude, coasting during which the planet surface is imaged and correlated to reference maps to estimate cross-track and along-track navigation errors and one or more lateral braking maneuvers are performed to reduce cross-track navigation error, and performing a terminal velocity braking maneuver(s) to reduce the along-track braking maneuver and remove the remainder of the velocity just prior to landing. A bi-propellant propulsion system provides a very high T/M ratio, at least 15:1 per nozzle. Short, high T/M divert maneuvers provide the capability to remove cross-track navigation error efficiently up to the maximum resolution of the reference maps. Short, high T/M terminal velocity braking maneuver(s) provide the capability to remove along-track navigation error to a similar resolution and remove the remaining velocity in a very short time window, approximately 3-15 seconds prior to touchdown. The propulsive efficiency frees up mass which can be allocated to a fuel to remove the unknown navigation errors, perform hazard avoidance and/or relocate the lander by flying it to another site or be allocated to additional payload.

27 Claims, 16 Drawing Sheets

OTHER PUBLICATIONS

Jason Bates, Space News Staff Writer Space News Business Report, "Raytheon Proposes Kill Vehicle Technology for Lunar Mission" Apr. 14, 2005, www.space.com/spacenews/archive05/lunar041805.html.

J.N. Head, G.V. Hoppa, T. G. Gardner, K. S. Seybold, and T. Svitek, Autonomous Low Cost Precision Lander for Lunar Exploration. #1471, Proc. Of the 36th Annual Lunar and Planetary Science Conference, #1471, League City, Tx, Mar. 2005, pp. 1-2 and 25-26.

Presentation of a poster P23A-0222 "Autonomous Low Cost Precision Lander for Lunar Exploration" during 36th Annual Lunar and Planetary Science Conference, #1471, League City, Tx, Mar. 2005.

J.N. Head, G.V. Hoppa, T. G. Gardner, K. S. Seybold, "Low Cost Precision Lander for Lunar Exploration" AGU, 85(47), Fall Meet. Suppl., Abstract P23A-0222, 2004.

J.N. Head, G.V. Hoppa, T. G. Gardner, K. S. Seybold, "Low Cost Precision Lander for Lunar Exploration", American Astronomical Society, DPS meeting #36, #14.26; Bulletin of the American Astronomical Society, vol. 36, p. 1097, Dec. 2004.

'Kill Vehicle' Technology Could Land Low-Cost Science Missions on Moon, Lunar Enterprise Daily, Dec. 20, 2004.

* cited by examiner

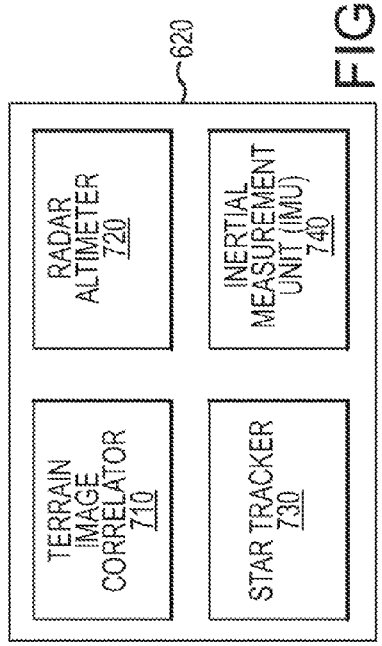
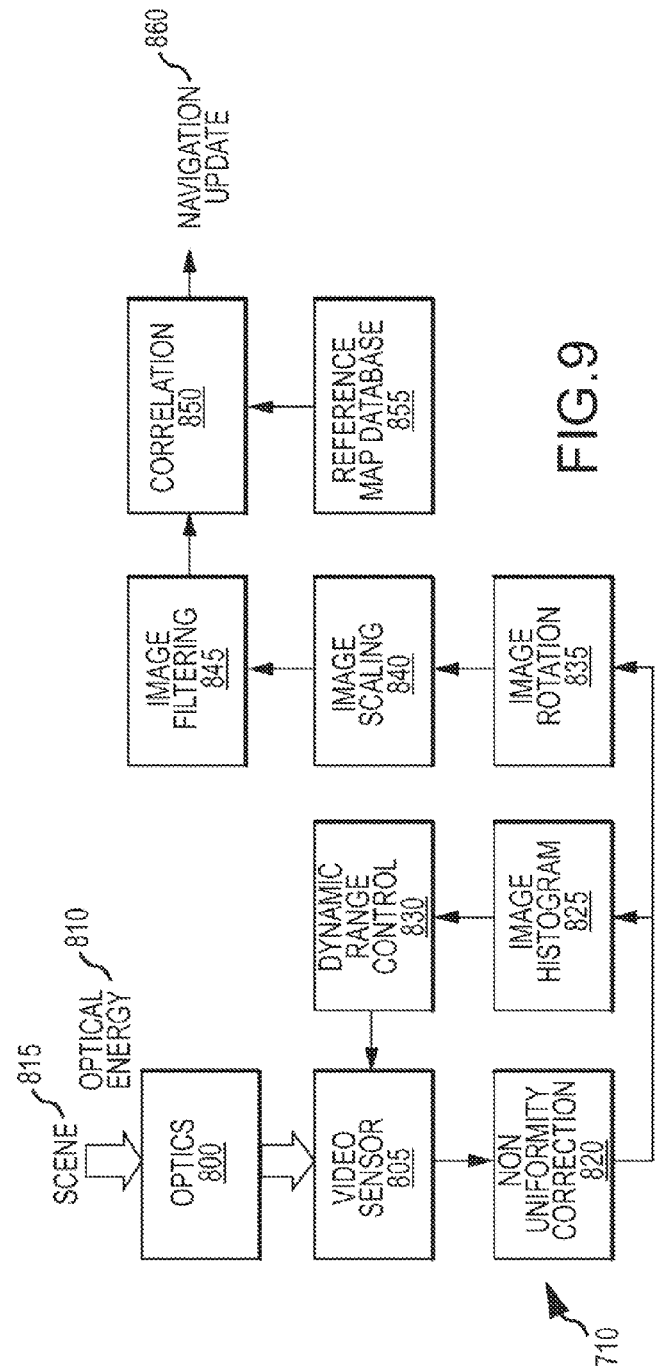

| MANEUVER | ΔV (m/s) | FUEL USAGE (kg) |
|---|---|---|
| LANDING BRAKING STAGE | 2454 | 199.9 |
| LANDER DESPIN AND SRM AVOIDANCE | 1 | 0.03 |
| ALONG TRACK TARGETING/VELOCITY MANAGEMENT | 210 | 7.97 |
| MID-COURSE LATERAL TARGETING | 40 | 1.60 |
| TERMINAL LATERAL TARGETING | 20 | 0.79 |
| LANDING ACS | 1 | 0.03 |
| LIFT-OFF | 22.3 | 0.70 |
| RE-LAND TARGETING | 20 | 0.63 |
| RE-LAND ACS | 1 | 0.04 |
| RE-LAND VELOCITY MANGEMENT | 65 | 2.58 |

AUTONOMOUS SPACE FLIGHT SYSTEM AND PLANETARY LANDER FOR EXECUTING A DISCRETE LANDING SEQUENCE TO REMOVE UNKNOWN NAVIGATION ERROR, PERFORM HAZARD AVOIDANCE AND RELOCATE THE LANDER AND METHOD

CROSS-REFERENCE TO RELATED APPLICATIONS

This application claims benefit of priority under 35 U.S.C. 119(e) to U.S. Provisional Application No. 60/833,557 entitled "Autonomous pinpoint-soft propulsive relocate-able planetary lander" and filed on Jul. 27, 2006, the entire contents of which are incorporated by reference.

BACKGROUND OF THE INVENTION

1. Field of the Invention

This invention relates to autonomous unmanned space flight systems and planetary landers, and more specifically to a planetary lander for executing a discrete landing sequence that can land softly with pinpoint accuracy, detect and avoid hazards, and relocate by taking off and flying to different sites. Hazard avoidance and relocation enhance the mission capability of the lander.

2. Description of the Related Art

The mission of the National Aeronautics and Space Agency (NASA) is to pioneer the future in space exploration, scientific discovery and aeronautics research. Although manned exploration in the form of the moon landings, the space shuttle missions, international space station and possible mission to Mars garner most of the attention, unmanned exploration is critical to NASA's mission. Unmanned exploration is less risky, more cost effective and can perform missions beyond the reach of manned exploration. Unmanned planetary landers such as Viking, the Mars Polar Lander, Phoenix, Survey or etc. provide the capability to land softly on a planet, asteroid or other body in the solar system (hereinafter "planet") and perform important planetary science.

Conventional all-propulsive autonomous planetary landers ignite liquid fueled thrusters at the terminal landing altitude after aeroshell and parachute separation (in atmosphere, aka Mars) or solid rocket motor (SRM) separation (airless bodies, aka the Moon) and burn continuously until the last meter before landing to execute a continuous landing sequence. Some landers forgo the SRM burn and rely solely on liquid thrusters. The SRM/parachute and liquid-fuel thrusters are designed to gradually decelerate the lander starting at a relatively high altitude (few kms) so that the lander falls slowly through the near surface constant gravity field and lands almost directly beneath the point at which the thrusters are ignited. During most of the descent, the thrusters have been specifically designed to produce a thrust that is a fraction of the specific gravity of the planet so that the lander resists the pull of gravity and falls very gently. At the last moment, when most of the fuel has been depleted the thrust briefly exceeds the planet's gravity allowing the lander to stop briefly before free falling the last few meters for a soft landing on the surface. The liquid propulsion system uses mono or bi-propellant thrusters, usually in a cluster configuration, that produce just enough thrust for the controlled descent over extended burn times, e.g. 90 seconds. For example, the Phoenix Mars lander uses a twelve thruster cluster to produce a total thrust-to-mass ratio (T/M) (thrust to total wet lander mass) in $m/sec^2$ of about 3:1 during initial free fall and increasing to about 15:1 (when most of the fuel has been depleted) momentarily to stop. The configuration of the propulsion system will depend on the planet's actual gravity, but the principles are the same. Mars landers will require more fuel and thrusters to produce greater thrust due to Mars gravity (as compared to lunar) for a similar continuous burn time. In addition, during descent the thrusters are usually off-pulse modulated to balance the center of mass and reduce the time averaged thrust to maintain the desired T/M ratio as the propellant is depleted.

Essentially all of the lander's change in velocity ($\Delta V$) capability (total integrated thrust from the SRM and liquid to remove lander velocity) is used to land softly on the planet's surface. The lander's fuel mass fraction (FMF) (ratio of fuel mass to total lander mass) is high, approximately 40% or greater. The remaining available mass is allocated to payload (e.g. scientific instruments) and required lander systems and even than the payload mass fraction (PFM) (ratio of payload mass to total dry mass) is only about 5-10% typically. Landers may remove a portion of the known guidance error caused by SRM burn or the parachute but do not address the unknown navigation errors. The lander does not have the fuel margin, navigation measurement capability or T/M ratio to remove unknown navigation errors. The additional fuel alone would increase the FMF to the point that there would be no remaining mass left to allocate to payload thereby entirely defeating the purpose of the mission. Even if fuel were available, the limited T/M capability is inadequate to efficiently remove navigation error. Conventional landers are designed to land the payload on the surface of the planet with minimum risk in areas know a priori (via remote sensing images) to be free of hazards such as rocks.

Typical state-of-the art landers have an error of approximately a 1 km×3 km ellipse for a lunar landing and approximately 30 km×230 km ellipse for a landing on Mars. The early SRM burn to remove lander velocity (no atmosphere) and the use of the aeroshell to penetrate the atmosphere and the parachute to slow the lander (atmosphere) induces considerable error that cannot be removed by the lander due to the lack of $\Delta V$ capability. This lack of precision delivery capability limits landing sites to flat, relatively uninteresting areas from a planetary science perspective in order to provide a low-hazard landing site. As mapping improves (higher resolution images) hazards are discovered and it becomes more difficult to find suitable landing sites that satisfy the risk averse mission planners. The instrument package may be incorporated in a rover that can drive to more desirable sites but this increases risk (rover survives landing and drives for many days to the site), mass and cost.

SUMMARY OF THE INVENTION

The present invention provides an autonomous unmanned space flight system including a braking stage and a planetary lander that can land softly and accurately, detect and avoid hazards, and relocate by taking off and flying to different sites with increased payload capability.

This is accomplished by executing a discrete landing sequence including performing an initial velocity braking maneuver to remove velocity at altitude, coasting during which the planet surface is imaged and correlated to reference maps to estimate the navigation error (cross-track and along-track) and one or more lateral braking maneuvers are performed to reduce cross-track navigation error, and performing a one or more terminal velocity braking maneuver(s) to reduce along-track navigation error and remove the remainder of the velocity just prior to landing. The initial velocity breaking maneuver removes most of the velocity and typically over 70% but is not well controlled (e.g. SRM or parachute) and induces large known guidance errors and increases unknown navigation errors. Performing the initial velocity braking maneuver earlier than is necessary to land softly on the planet sacrifices some fuel efficiency but provides the necessary measurement time to determine and correct the unknown cross-track navigation error and perform hazard avoidance. A bi-propellant propulsion system provides a very high T/M ratio, at least 15:1 per nozzle. Short, high T/M lateral divert maneuvers provide the capability to remove cross-track navigation error efficiently up to the maximum resolution of the reference maps. Short, high T/M terminal velocity braking maneuver(s) provide the capability to remove along-track navigation error with the same accuracy and remove the velocity in a very short time window, approximately 3-15 seconds prior to landing. The discrete landing sequence has a propulsive ($\Delta V$) efficiency that far exceeds conventional space flight systems and landers, hence the fuel mass requirements are less. This frees up mass which can be allocated to fuel to remove unknown navigation error, perform hazard avoidance and/or relocate the lander by flying it to another site or be allocated to additional payload.

In an exemplary embodiment, an autonomous space flight system includes a planetary lander and a braking stage that separates after the initial velocity braking maneuver is performed. The braking stage could be a SRM or another liquid propulsion system (lunar) or an aeroshell or aeroshell and parachute (Mars). The planetary lander delivers a payload having a payload mass fraction (PMF) of suitably at least 15% and typically greater than 25% of landed dry mass of the lander. The lander's bi-propellant propulsion module includes fuel tanks for storing propellant and a set of nozzles configured to expel the propellant to perform terminal velocity braking and lateral divert maneuvers. The propulsion module provides a thrust-to-mass (T/M) ratio of between 15:1 and 100:1 per nozzle and preferably 25:1 to 60:1. The Lander's avionics module includes navigation, hazard avoidance and guidance subsystems. The navigation subsystem includes at least one sensor configured to gather terrain data while coasting after separation from the braking stage and a terrain image correlator configured to correlate the gathered terrain data to reference maps to provide a navigation update. The hazard avoidance subsystem is configured to generate a hazard map from the gathered terrain data. The guidance subsystem is configured to (a) process the navigation update to estimate a navigation error (cross-track and along-track) with respect to a specified landing site designated in the reference map and issue discrete pulse-width modulation command signals to the propulsion module to perform at least one lateral divert maneuver to reduce the cross-track navigation error to much less than 1 km and preferably to the maximum resolution of the reference maps and to perform at least one terminal velocity braking maneuver to reduce the along-track navigation error similarly and to remove the lander velocity so that the lander lands softly on a landing attenuation system, (b) if necessary to avoid a hazard, modify the navigation update to reflect a new landing site and issue another command signals to perform a lateral divert hazard avoidance maneuver to avoid the hazard and (c) issue a command signal to perform one or more relocation maneuvers to fly the lander to at least one additional landing site.

The addition of hazard avoidance using the same sensors and propulsion system significantly reduces the landing risk. During the descent phase, hazard detection occurs in a real time environment to eliminate the chance of a catastrophic event due to a hazard impact at the desired landing site. Passive imagery combined with a radar altimeter can be used to identify and avoid these hazards on a planetary surface. Further utilizing the propulsive system capability with the aid of hazard detection and avoidance algorithms implemented using the sensor and terrain correlator, allows for an innovative mobility approach that enables a multi-kilometer powered flight, propulsive re-location, to a nearby site where additional science measurements can be repeated or taken. This new class of surface mobility can land on target sites in between hazardous terrains to reach scientifically valuable sites, to characterize resources of planetary bodies and minimize mobility requirements of a surface rover system.

These and other features and advantages of the invention will be apparent to those skilled in the art from the following detailed description of preferred embodiments, taken together with the accompanying drawings, in which:

BRIEF DESCRIPTION OF THE DRAWINGS

FIG. 8 is a block diagram of the major subsystems of the navigation subsystem;

FIG. 9 is a block diagram of the navigation subsystem's terrain image correlator;

DETAILED DESCRIPTION OF THE INVENTION

The primary mission of a planetary lander and particularly the lander's propulsion and guidance system is to deliver the lander's payload softly and safely to the surface of the planet in the general vicinity of a specified landing site. Lander missions are very high profile, expensive and only occur once every few to several years. Consequently, NASA and the mission planners are understandably 'risk averse'; they want to use known technology (hardware and software) to implement low risk (or at least perceived to be low risk) landing sequences during terminal descent to the planet's surface. Failure to deliver the payload e.g. sophisticated, delicate and expensive scientific instrumentation to the surface results in total mission failure.

Once the lander reaches its terminal landing altitude after parachute separation (in atmosphere, aka Mars) or solid rocket motor (SRM) separation (airless bodies, aka the Moon), the lander initiates its post-separation terminal descent to the planet's surface. On a particular planet and for a given lander mass and descent velocity, the total integrated thrust or total impulse (e.g. SRM+liquid) required to remove that velocity and land safely and softly on the surface is dictated by physics i.e. the propulsion and guidance systems must remove the kinetic energy of the vehicle under the acceleration of the planet's gravity. How the available total impulse is used will affect propulsive efficiency and overall lander capability.

Figure 1:
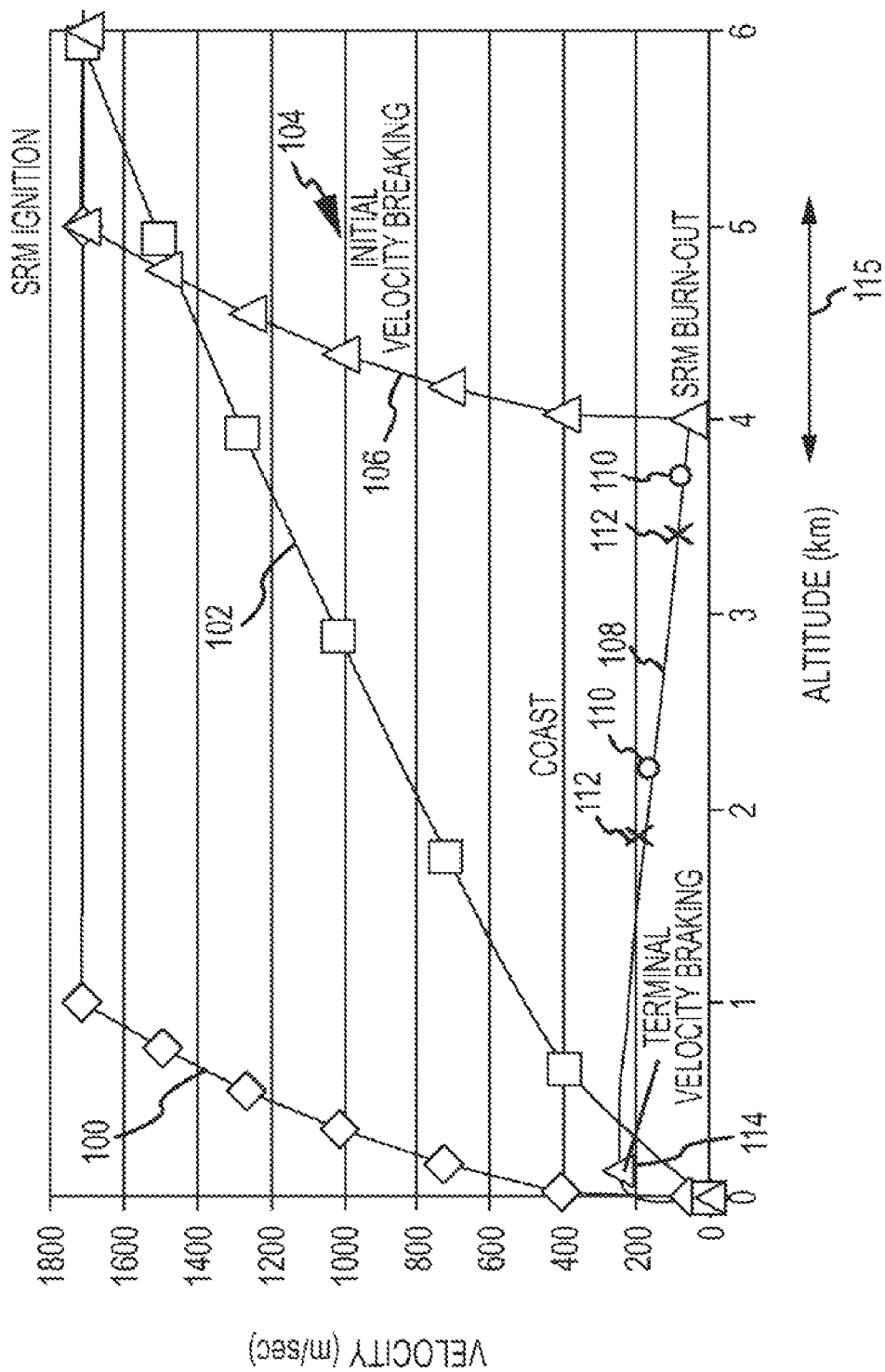
FIG. 1 is a plot of lander velocity versus altitude for an ideal lander, a conventional lander and a lander in accordance with the current invention.

In an ideal landing sequence to remove velocity for a soft landing, the total impulse, SRM+liquid, would occur right at the landing point, all at once and would consume an infinitely small amount of time, aka ideal $\Delta V$. This is obviously physically impossible. As shown in FIG. 1, the physical ideal landing sequence 100 approximates the theoretical ideal by delaying deceleration as long as possible and starting a high T/M ratio SRM burn with just enough time to consume all the SRM propellant, separating and having the liquid system produce a high T/M ratio and consume all its propellant just as the lander soft lands. This sequence is 'ideal' in that it requires the minimum fuel mass to land. The state-of-the-art hardware and software available in the art of planetary landers is nowhere near capable of executing even a gross approximation of such a landing sequence to provide a safe and soft landing. The achievable T/M ratios by the liquid systems used in conventional landers given practical mass and fuel constraints are insufficient. Furthermore, even if such technology were available the real or perceived risk of, for example, allowing the lander to closely approach the surface at 2500 m/s and then slamming on the brakes defies the conventional wisdom of NASA's mission planners.

Consequently, the conventional landing sequence 102 executed by both previous and planned future landers starts gently decelerating the lander at a high altitude (e.g. a few km) with an early SRM burn or parachute deployment (terminating roughly 90 seconds before landing) and then executes a continuous low T/M ratio burn to allow the lander to fall softly to the planet. The smooth and gentle descent illustrated by sequence 102 is approximately the same whether performed by liquid fuel burn alone, SRM and liquid burn, or aeroshell/parachute and liquid burn. In principle this conventional landing sequence 102 is very similar to the physical ideal sequence 100 in that the fuel (SRM and/or liquid) is burned continuously to landing and the total impulse is the same, but at a much lower T/M ratio over a much longer time. Although intuitive and supported by known lander technology, this approach unlike the physical ideal landing sequence suffers from high gravity loss and thus the propulsive efficiency is low and the required fuel mass is high. As a result, the overall lander functionality and payload capacity is highly constrained. Typically, PMFs are 5-10% and there is no fuel margin to allocate to reduce navigation error, perform hazard avoidance or relocate the lander even if the lander had the T/M capability to perform such maneuvers which it does not.

In a non-analogous art, anti-missile ground-based interceptors use Exoatmospheric Kill Vehicles (EKVs) to collide with and destroy enemy missiles. Conventional planetary landers are tasked with delivering a delicate scientific payload into a large flat field on the surface of a planet whereas EKVs are tasked with the proverbial "hit a bullet with a bullet" problem. In order to accomplish this very difficult task for use in the 'exoatmosphere' (aka space), Raytheon in conjunction with Aerojet Corporation devised a bi-propellant propulsion system that can deliver thrust with high propulsive efficiency and very high T/M ratios per nozzle (e.g. greater than 15:1). Essentially the fuel tanks were made thicker to withstand much higher pressures e.g. 1500 psi vs. 300 psi for conventional bi-propellant systems, which increases the minimum T/M ratio per nozzle by at least an order of magnitude. The EKV releases the propellant in short, high thrust pulses to perform lateral divert maneuvers to intercept the missile. The EKV propulsion system can deliver the same integrated total impulse in short, high thrust pulses as a continuous, low thrust system at a lower total fuel mass due to higher efficiencies and lower hardware mass due to fewer nozzles, valves, etc. A space flight system including a SRM and modified EKV propulsion system could be configured to execute the physical ideal landing sequence 100.

As discussed previously, a significant and unmet challenge is to provide the capability to deliver the lander more accurately to the specified landing site. This would allow mission planners to select more interesting landing sites, configure the scientific instrumentation for a particular landing site, and reduce or eliminate a 'rover' to move the instrumentation to the specified landing site, which frees up additional mass and eliminates risk of rover failure. Positional error includes a known guidance error component that is induced by SRM burn or parachute deployment and can be measured on-board the lander and an unknown cross-track and along-track navigation errors that exist because the lander is autonomous, has sensors that produce errors that cannot be determined onboard and does not have an external reference point during initial descent, e.g. the lander doesn't known what truth is. Even partially correcting for known guidance error, conventional landers still have very large position errors upon landing, >1 km×3 km ellipse on the Moon and a 30 km by 230 km ellipse on Mars for example. The physical ideal landing sequence 100 does not address navigation error and in fact does not allow the time required to determine and remove that error. In another non-analogous art, Raytheon's Tomahawk cruise missiles use a Digital Scene-Matching Area Correlation system (DSMAC) to gather terrain data as the missile flies above and approximately parallel to the Earth and correlate the gathered terrain data to reference maps to provide a navigation update to guide the missile to its target.

In order to exploit the capabilities of the EKV propulsion system (and the considerable investment to develop that system) and DSMAC technology to improve propulsive efficiency and landing accuracy we had to modify the propulsion system to provide braking as well as divert capability, reworking the plumbing, modifying the DSMAC for use on a Lander, devise a completely different landing sequence to use this capability both effectively and efficiently and modify guidance algorithm to control the propulsion system to execute the new landing sequence.

In accordance with the present invention, an autonomous space flight system and planetary lander have been devised to execute a discrete landing sequence 104 to deliver the lander softly and safely to the planet's surface and more accurately to the specified landing site as shown in FIG. 1. Discrete landing sequence 104 includes performing an initial velocity braking maneuver 106 (e.g., SRM ignition and burn-out) to remove velocity at altitude (e.g. 4-5 km) quickly, coasting 108 during which the planet surface is imaged 110 and correlated to reference maps to estimate the navigation error and one or more lateral braking maneuvers 112 are performed to reduce cross-track navigation error to less than 1 km and preferably to the maximum resolution of the reference maps, and igniting the liquid bi-propellant thrusters to perform a terminal velocity braking maneuver(s) 114 to remove the remainder of the velocity and along-track navigation error just prior to landing. The initial velocity breaking maneuver 106 performed well before landing, preferably within an optimum time window 115, suitably removes most of the velocity and typically over 70% but is not well controlled. The initial breaking maneuver is performed far enough ahead of landing to allow time to perform the lateral divert maneuvers. To maximize efficiency, the initial breaking maneuver should decelerate the lander quickly e.g. high T/M which can be accomplished either with a more powerful SRM or less total lander mass. A liquid bi-propellant propulsion system provides a very high T/M ratio in m/sec$^2$, at least 15:1 per nozzle (thrust to total wet lander mass). The T/M ratio will increase as fuel is burned and the lander mass is reduced. Short, high T/M divert maneuvers 112 provide the capability to remove cross-track navigation error efficiently up to the maximum resolution of the reference maps. Short, high T/M terminal velocity braking maneuver(s) 114 provide the capability to remove the velocity and along-track navigation error in a very short time window, approximately 3-15 seconds prior to touchdown.

Figure 2:
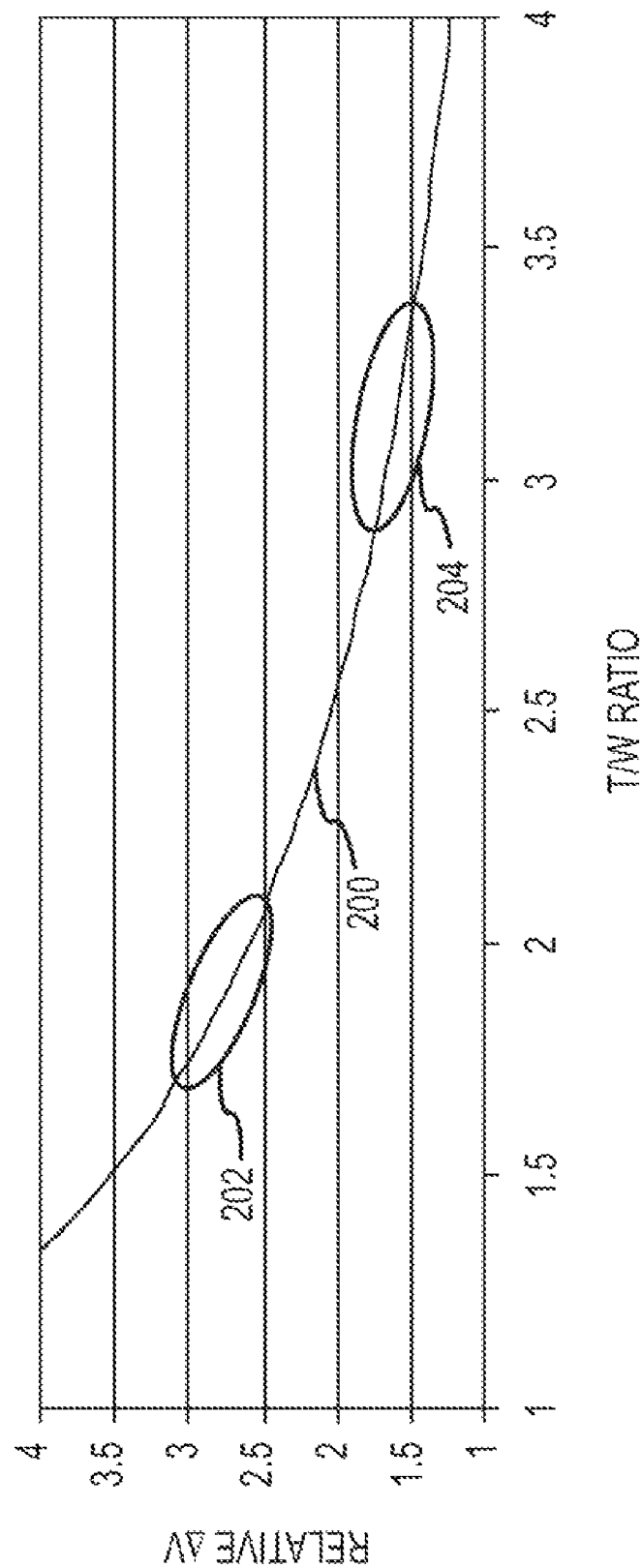
FIG. 2 is a plot of relative $\Delta V$ vs. thrust-to-weight (T/W) ratio on Earth comparing the relative propulsion efficiencies of conventional landers with the lander in accordance with the present invention.

FIG. 2 is a plot 200 of relative $\Delta V$ vs Thrust-to-Weight (T/W) ratio (on Earth) for a given lander. For a conventional lander 202 having relatively low T/W ratios the $\Delta V$ requirements are roughly 75% greater than for a lander 204 that is configured in accordance with the present invention to execute the discrete landing sequence described above. This difference in propulsive efficiency translates into a fuel mass fraction (FMF) of >40% for conventional landers and <40% and typically <30% for our Lander. This frees up mass which can be allocated to carry the DSMAC and to fuel to perform the divert maneuvers to remove unknown navigation error and to perform hazard avoidance and/or relocate the lander by flying it to another site or be allocated to additional payload. To be performed efficiently these functions also require a high T/M ratio. It is important to note that in theory, one could use multiple thrusters each producing a lower T/M ratio to achieve the total desired T/M to perform the lateral divert and velocity braking maneuvers. However, the additional mass of those thrusters, valves and plumbing reduces efficiency. Furthermore, fuel injected into rocket engines at lower pressures is inherently less efficient. The combination of additional hardware mass and fuel mass would degrade the Lander's capability to perform the discrete maneuvers and to deliver a useful PMF. Therefore, the high T/M per nozzle provided by the EKV propulsive or other similar hi-pressure systems is important to the execution of the discrete landing sequence and the provision of the additional hazard avoidance and relocation functions and high PMF.

A given lander can be configured to perform all of these additional functions with increased payload to some extent. The lander may be configured to land with less accuracy than the maximum resolution of the reference maps to conserve fuel or if not required by a mission. However, it is envisioned that given this capability it will be used to provide accuracies of at worst 1 km, suitably less than 100 m (known as "precision" landing), preferably 10 m (known as "pinpoint" landing) and typically most preferably to the maximum resolution of the reference map whatever that may be for a given planet or portion of the planet. These accuracies are typically specified as "3-sigma" limits e.g. a very small fraction of landings could fall outside the number. The combination of all three functions in the same lander greatly enhances mission capability far beyond the current state-of-the-art. An exemplary lander may have a PMF >20% and a liquid fuel budget allocated roughly 50% to null velocity, 30% to relocate the lander (single 1 km hop), 10% to remove navigation error to the map resolution and 10% to perform hazard avoidance. In general, the multi-capable lander would have a FMF <40%, a PMF of 15-25%, and a fuel budget of 40-60% to null velocity, 20-40% to relocate the lander, 5-20% to remove cross-track navigation error and 5-15% to perform hazard avoidance. Alternately, the available mass could all be allocated to additional payload or all be allocated to relocate the lander. The particular configuration and allocation of the $\Delta V$ liquid fuel budget will depend upon the mission.

Figure 3:
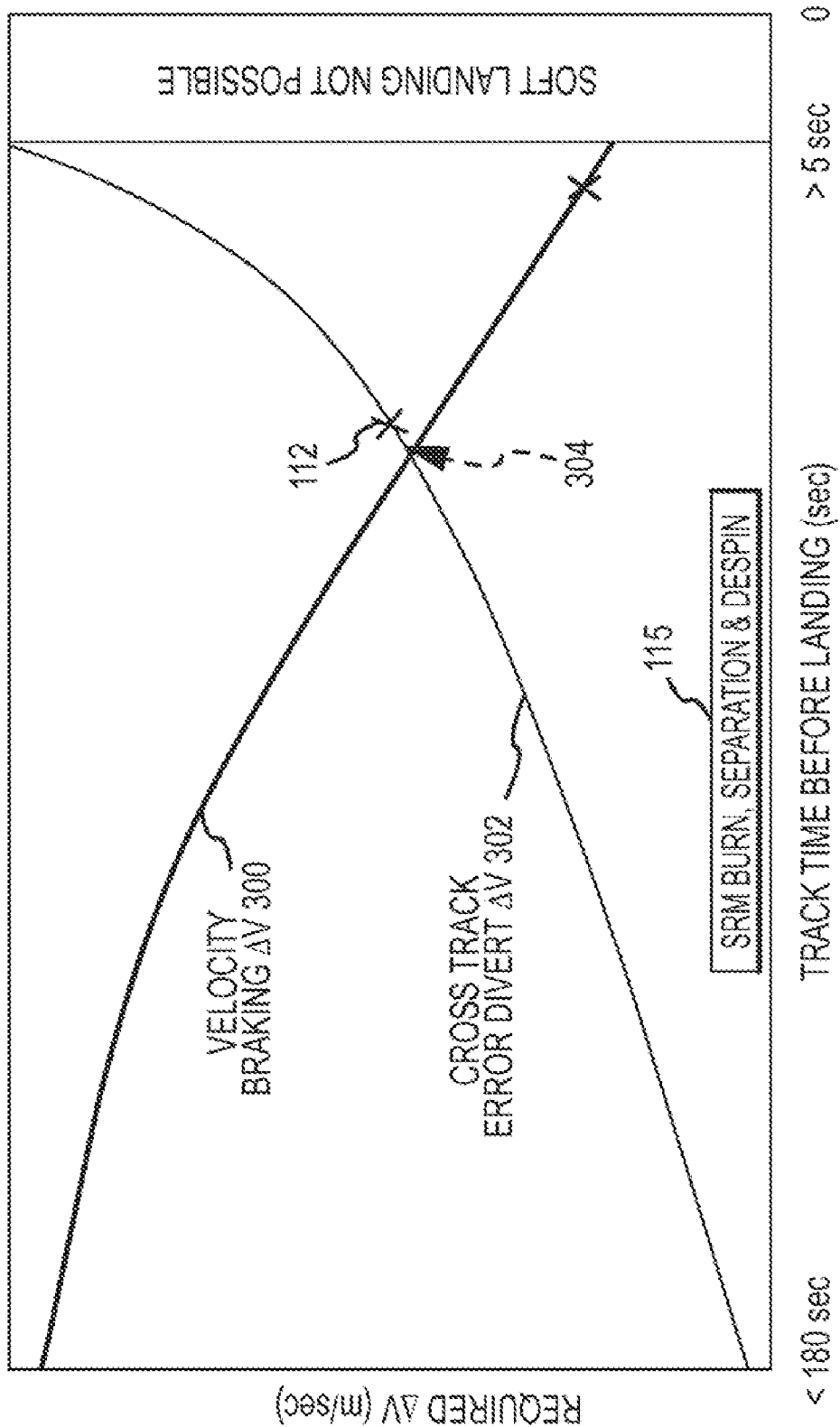
FIG. 3 is a plot of required $\Delta V$ vs. time before landing for braking $\Delta V$ and cross-track $\Delta V$.

FIG. 3 is a notional plot of required $\Delta V$ vs. time before landing for velocity braking $\Delta V$ 300 (also includes along-track error divert $\Delta V$) and cross-track error divert $\Delta V$ 302. This presumes that an initial velocity braking maneuver (e.g. SRM burn) has been performed to remove most of the lander velocity and deliver it over the landing site. In this example it takes at least 5 seconds to burn the liquid propellant to stop the lander. Furthermore, the total liquid $\Delta V$ capability to remove velocity and navigation error is approximately 1000 m/sec. Plot 300 shows that the longer the velocity braking is delayed the less $\Delta V$ is required, which is consistent with the physical ideal landing sequence. Plot 302 shows that the earlier the cross-track error divert is performed the less $\Delta V$ is required. Since the cross-track error divert cannot be performed prior to the SRM burn trade-offs must be made to land the lander softly and accurately to maintain propulsive efficiency. The 'optimal point' 304 where the total required liquid $\Delta V$ is minimum is the intersection of plots 300 and 302. If a conventional lander initiates continuous burn at about 90 seconds, the 'optimal point' (where the $1^{st}$ lateral divert maneuver is executed) may lie at about 60 seconds for example. By initiating the SRM approximately 60 seconds earlier than necessary in the physical ideal landing sequence in order to remove cross-track navigation error, we sacrifice about 20-25% in overall propulsive efficiency. However, the discrete landing sequence is so much more efficient than the conventional continuous landing sequence that we can tolerate this in efficiency and still increase PMF and perform the other value-added functions.

Figure 4:
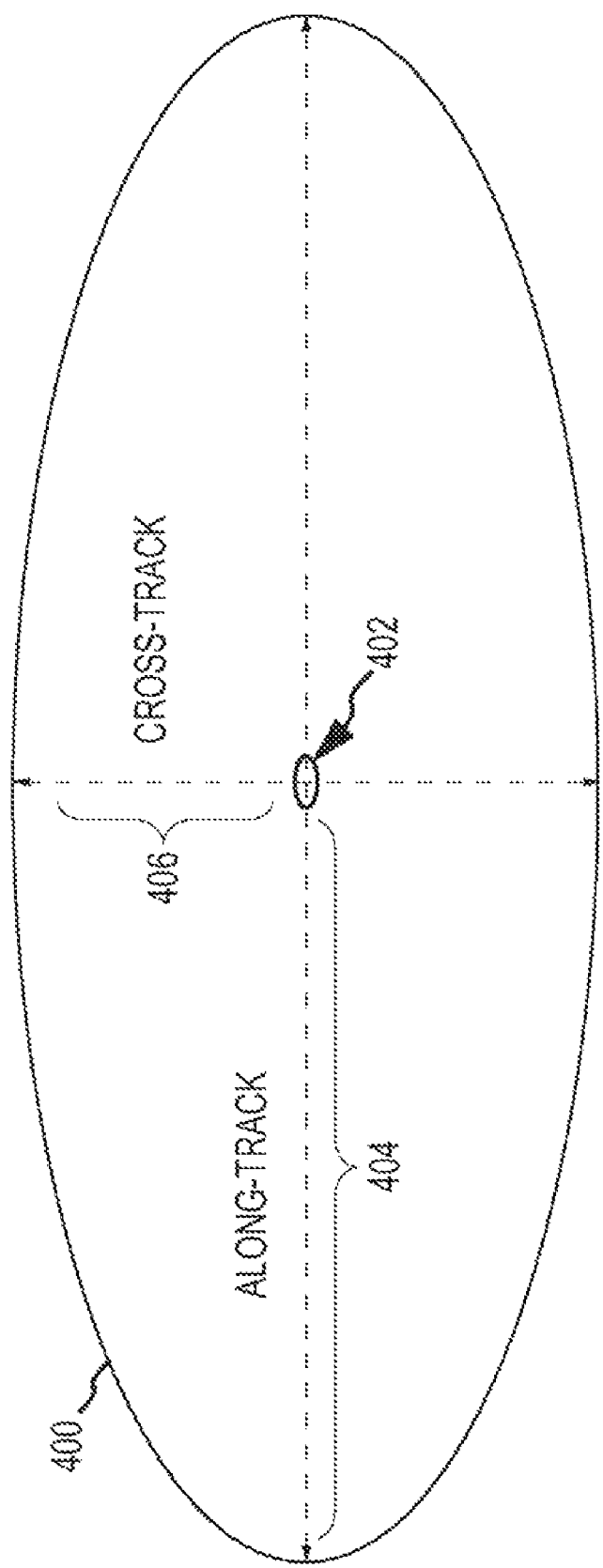
FIG. 4 is a diagram of a landing error ellipse from braking stage separation to landing.

The discrete landing sequence 14 shown above in FIG. 1 is derived from these plots and the optimal point. The initial velocity braking maneuver 106 is preferably initiated and completed (e.g. SRM burn, separation and despin) in time windows 115 prior to optimal point 304. Soon thereafter while coasting the lander performs the lateral divert maneuvers 112 to remove cross-track error. The earlier the lateral divert maneuver(s) are performed the less $\Delta V$ that is required. The lander than waits until approximately 5-8 seconds before landing to perform the terminal velocity braking maneuver to remove the remaining velocity and to remove the remaining along-track error. The later the velocity braking maneuver(s) are performed the less $\Delta V$ is required. These principles for constructing the three phases of discrete landing sequence 14 are generally applicable to all Landers on any planetary body. However, for other reasons the lander may sacrifice some amount of $\Delta V$ efficiency by conducting the initial braking maneuver sooner or later than is optimum, conducting multiple lateral divert and or multiple velocity braking maneuvers. FIG. 4 is a diagram showing a landing error ellipse 400 at separation from the braking stage and the landing error ellipse 402 achieved by the Lander and discrete landing sequence of the current invention for a Lunar landing. The landing error ellipse includes an 'along-track' error 404 and a 'cross-track' error 406. At separation, the along-track error is typically >3000 m and the cross-track error >1000 m due to errors induced from leaving orbit and SRM burn. (Note: these numbers are >230,000 m and >30,000 m for Mars landings). The conventional lander and continuous landing sequence do not reduce either along-track or cross-track error. By comparison, the Lander and discrete landing sequence are capable of reducing both errors to the maximum resolution of the reference maps, about 10 m in this example for either a Lunar or Mars landing. In general, the Lander performs a lateral divert maneuver to remove cross-track error 406. The Lander performs a terminal velocity braking maneuver to remove velocity and is able to remove the along-track 404 at the same time. For example, the Guidance system may aim past the specified landing site at the center of the ellipse and kill the velocity thereby pulling the predicted landing site back towards the center of ellipse.

Figure 5A:
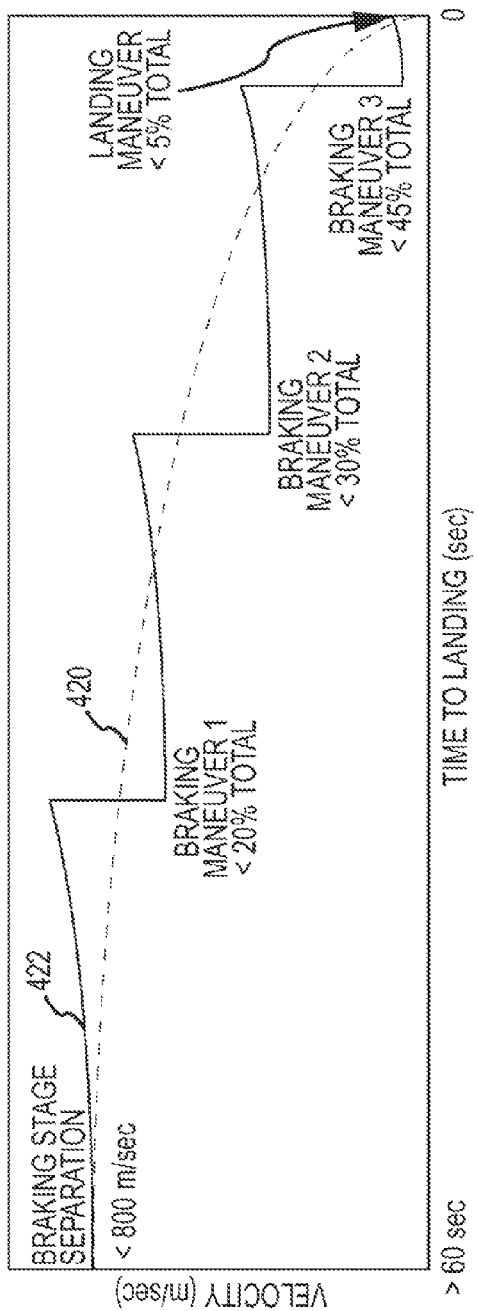
FIGS. 5a and 5b are plots of velocity vs. time to landing and cross-track error vs. range to landing, respectively.
Figure 5B:
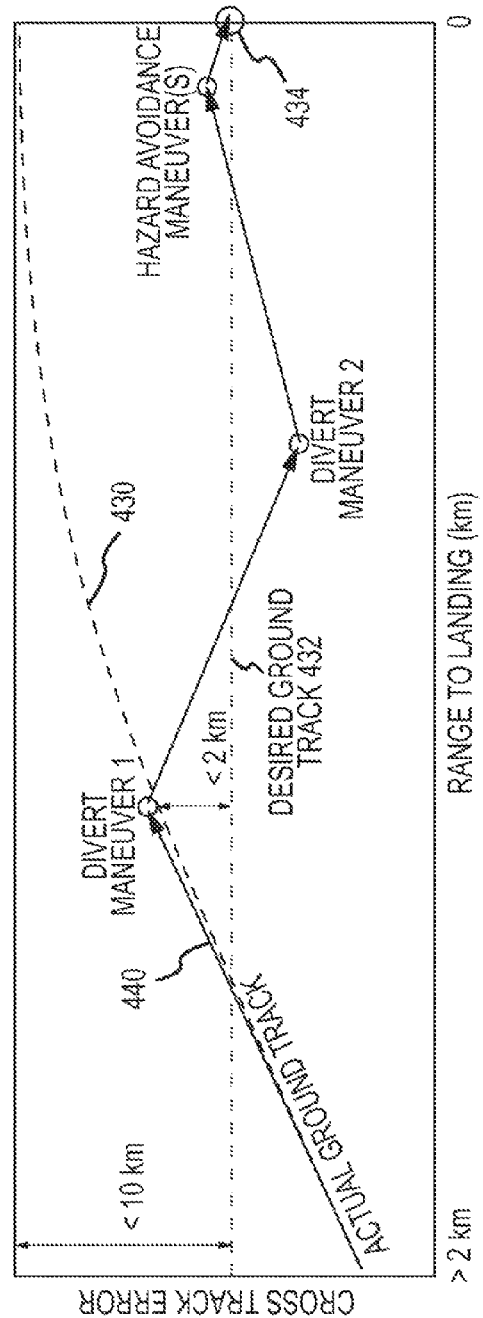

FIGS. 5a and 5b are plots of lander velocity versus time to landing and cross-track error versus range to landing, respectively, comparing the conventional continuous landing sequence to the discrete landing sequence in which multiple velocity braking maneuvers and multiple lateral divert maneuvers are performed. Although it is possible and more efficient to perform each correction with a single maneuver, from an overall system or mission standpoint it may be desirable or required to perform one or both corrections iteratively.

As shown in FIG. 5a, the velocity 420 for the conventional landing sequence decelerates slowly and smoothly until landing. This is a direct result of the continuous burn of the liquid propulsion system. In addition to being less efficient as described previous, once the continuous burn is initiated it continues until landing. The lander does not stop and restart the burn and cannot throttle the thrust. As a direct consequence, the conventional lander does not have the control authority to remove along-track navigation error. The velocity 422 for the discrete landing sequence increases after separation until braking maneuver 1 (representing <20% of the total) is performed reducing the velocity abruptly. This is performed twice more for Braking Maneuvers 2 (<30% total) and 3 (<45% total) until <5% of the velocity remains. At this point a landing maneuver is performed to avoid any hazards and land. Each Braking Maneuver not only reduces velocity but pulls (or pushes) the Lander towards the center of the landing error ellipse to remove along-track error. The optimum number of braking maneuvers, integrated thrust, timing etc. will depend on the particular Lander and a number of other factors.

As shown in FIG. 5b, the ground track 430 for the conventional landing sequence follows the actual ground track of the lander after separation. As discussed previously, conventional landers have minimal lateral divert capacity having neither the mass to the carry the extra fuel or the T/M ratio to perform the maneuvers efficiently. As a result, the conventional lander may have a cross track error of just less than 10 km from a desired ground track 432 at the specified landing site 434. By comparison the ground track 440 of the discrete landing sequence follows the actual ground track until the cross-track error exceeds some threshold e.g. 2 km at which time the Lander performs Divert Maneuver 1 to turn the Lander back towards the desired ground track 432. In this example, the Lander overshoots and Divert Maneuver 2 is performed to remove the cross-track error from the originally specified landing site. In the last few seconds (after the final Braking Maneuver 3), the Lander performs the Hazard Avoidance Maneuver(s) to move the specified landing site 434 to a safe location.

As has been clearly demonstrated, the Lander configuration and discrete landing sequence that exploit the high T/M capabilities of the EKV liquid bi-propellant propulsion system and the Tomahawk DSMAC provide a Lander with greatly enhanced capabilities. First, the Lander can remove tens to hundreds of kilometers of unknown navigation error to land the Lander within meters of the specified landing location, limited only by the resolution of the reference maps (and IMU error). Second, the Lander can land softly and accurately with much less fuel mass. This mass can than be allocated to liquid fuel to provide hazard avoidance and/or relocation, both of which further leverage the high T/M and DSMAC capabilities. Lastly, the mass can be allocated to deliver significantly more payload to the planet thereby greatly enhancing the scientific measurement capabilities of the mission.

Autonomous Space Flight System and Planetary Lander

Figure 6:
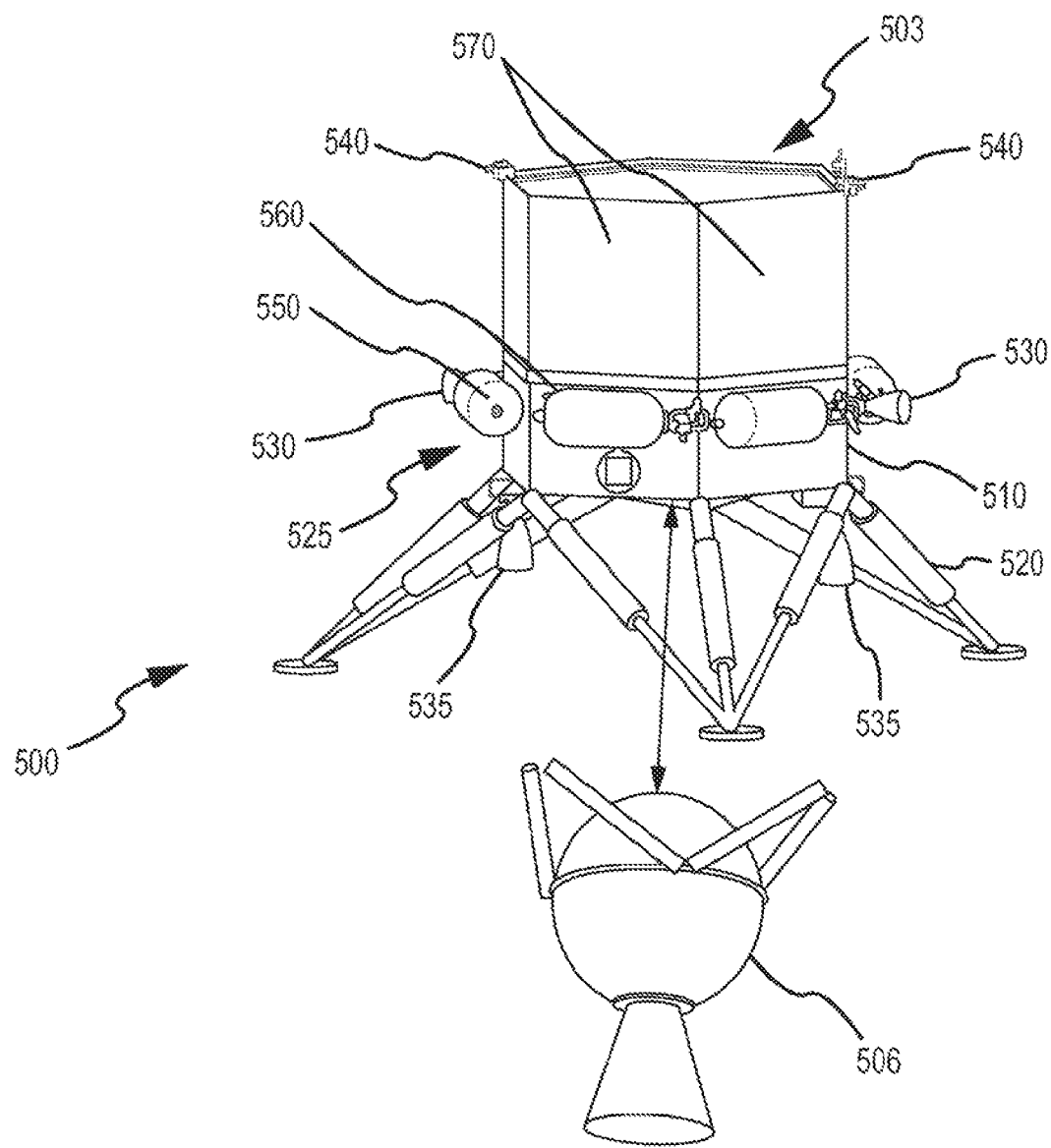
FIG. 6 is a simplified diagram of a space flight system and planetary lander in accordance with the invention.

FIG. 6 shows an artist's conception of an exemplary Space Flight System 500 including a Lander 503 and a solid rocket motor (SRM) 506 (shown separated from the Lander). The Lander is comprised of a chassis 510, which may house electronic subsystems, supported by a landing attenuation system 520 e.g. a plurality of legs. The Lander includes a propulsion module 525 including nozzles 530 that provide radial thrust to perform lateral divert maneuvers and nozzles 535 that provide axial thrust to perform velocity braking maneuvers. Both maneuvers could be performed with a single thruster by slewing the lander but this is less efficient. The system also includes ACS nozzles 540 for precise attitude control. The propulsion module is a bi-propellant system with separate tanks for fuel 550 and oxidizer 560 supplies, 4 each in this configuration. Helium tanks located inside the chassis are used to pressurize the system. A payload module including scientific instrumentation for conducting experiments on the planet surface and the avionics module are also located inside the chassis. The Lander may also include solar panels 570 for generation of electricity. Note that FIG. 6 shows an example configuration and innumerable other physical designs are possible within the scope of the invention.

The propulsion module 525 is preferably a liquid bipropellant DACS system such as that developed by Raytheon in conjunction with Aerojet Corporation and deployed on the EKV interceptor ground based midcourse missile defense program. The tanks have thicker walls than conventional bi-propellant tanks and thus can be pressurized to over 1300 psi to produce T/M >15:1 per nozzle and typically >25:1. To avoid damaging the payload, the T/M is <100:1 and more typically <60:1. The DACS propulsion system from EKV was modified for use on a Lander although none of the modifications required the development of new technology. Specifically, nozzles to provide axial thrust for velocity braking maneuvers were re-oriented. In addition, the propellant delivery 'plumbing' had to be redesigned. In general, the EKV propulsion technology was designed with more stressing requirements than needed for planetary landing.

The currently preferred propellants are nitrogen tetraoxide ($N2O4$) oxidizer and an M20 fuel. M20 is a blend of hydrazine, monomethyl hydrazine and ammonia. This propellant combination was specifically developed for EKV to achieve a mixture ratio close to one and to mitigate ignition shock. Preferably pairs of propellant tanks one each for the oxidizer and fuel, are located equidistant from the center of gravity (CG). This design minimizes CG movement as propellant is expelled, improving controllability of the vehicle. Tanks may be cylindrical in shape with an internal metallic diaphragm that collapses across the primary axis of the tank. High expulsion efficiencies (>97%) can be achieved and control of the expulsion process is excellent even under the demanding flight operation requirements.

The propulsion system is initiated by opening the pyro valve located at the pressure tank. Helium then flows through the regulator and into the propellant tanks. Since the main engine valves have a gas operated pilot valve, some helium is fed into a manifold for this operation. Breaking of the burst discs that are integral with the propellant service valves initiates propellant flow. The latching valves are opened and thrusters are operated briefly (a few milliseconds) to remove any air from the lines. The system is then ready to operate and continues to function through landing. Upon landing the pressure relief valve will be exercised to vent the pressurant tank to ambient. After the pressure has been relieved, the two latching valves will be closed, locking any remaining propellant in the tank. The thruster valves will then be opened briefly to eliminate any pressure in the propellant manifold that could produce leakage. Pressure transducers are located on both sides of the regulator and in both propellant circuits to provide flight data for post-test analysis. Thermocouples are not included in the EKV propulsion system and will be added to the tanks, engine valves and regulator.

This propulsion technology offers significant benefits in the Lander application, including high T/M ratios >15:1 per nozzle and fast response time, e.g. ~7 ms minimum pulse widths with current technology. Lateral divert maneuvers can range from approximately 10 ms all the way to the limit of the engine (<20 sec) but are typically are less 1 second for control and navigation update purposes. The total vertical braking maneuver is a few seconds (3-15 seconds) long. The T/M lies between 15:1 and 100:1 and preferably between 25:1 and 60:1. If the T/M is too low the Lander cannot execute the discrete landing sequence, perform hazard avoidance or relocate efficiently and if the T/M is too high it may damage the instrument payload. The specific T/M ratio for a given Lander will depend on the dry mass of the Lander, the point in the landing sequence (T/M increases as fuel is depleted), the specific implementation of the propulsion system (thrust per nozzle) and the mission requirements. The use of a liquid bipropellant propulsion system in the Lander allows for an innovative mobility approach that enables multi-kilometer powered flights to a nearby site where additional science measurements can be repeated or taken. The overall result is a lander which flies with the agility and maneuverability of a high performance missile.

The propulsive efficiency that can be achieved using the high T/M liquid bi-propellant system to execute the discrete landing sequence is a significant improvement over conventional landers and landing sequences. Typical landers have a FMF of >40% and a PMF of 5-10%. Our lander has a FMF <40% and typically <30%, which frees up considerable mass. In typical configurations of the lander that also remove navigation error, perform hazard avoidance and provide relocation capability the PMF may still be increased to at least 15% and more typically greater than 25%. If the entire mass savings were allocated to additional payload, the PMF could be greater than 40%.

Figure 7:
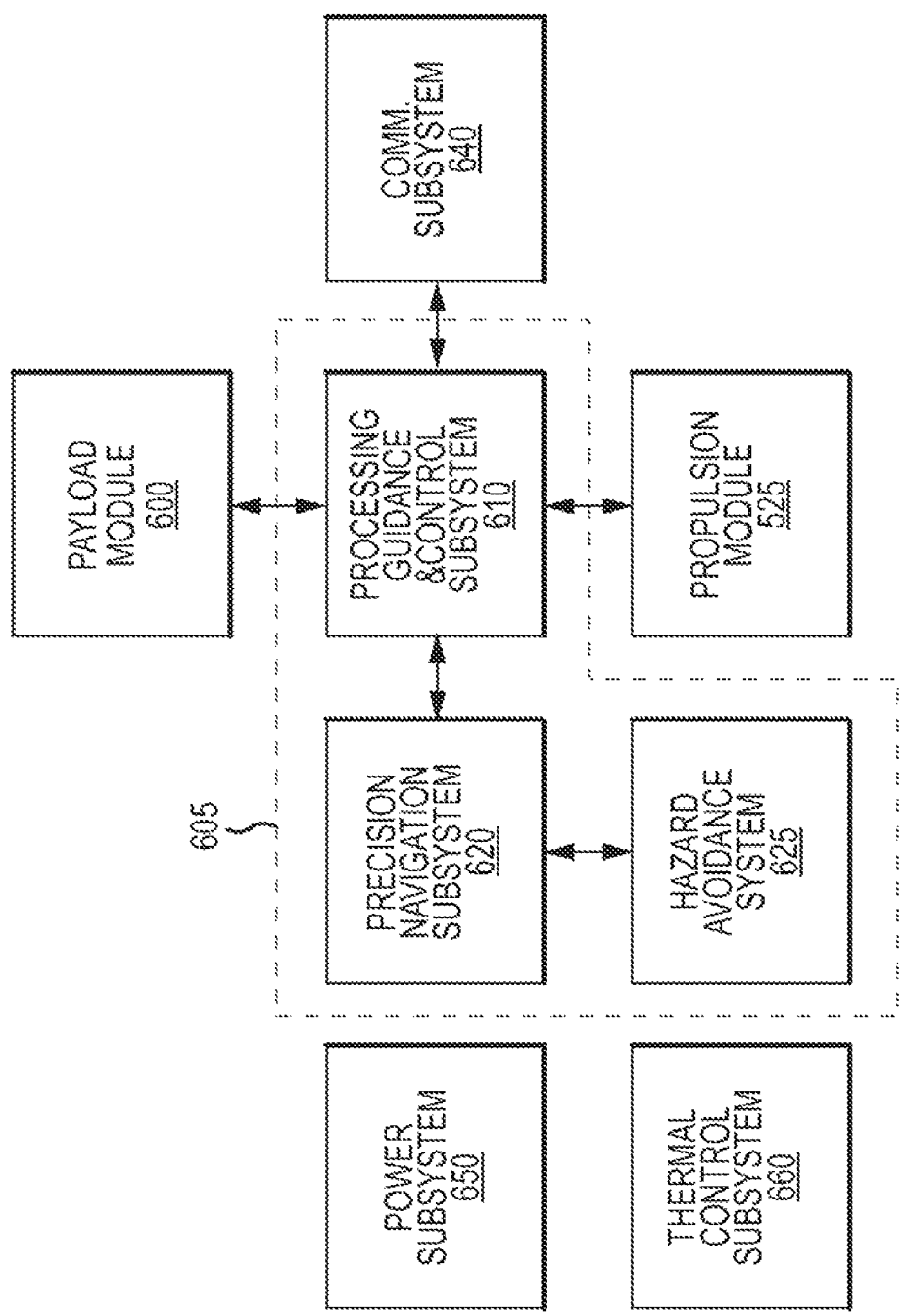
FIG. 7 is a block diagram of the major modules and the subsystems on the planetary lander.

FIG. 7 is a block diagram of the major modules including the propulsion module 525, payload module 600 and avionics module 605. The avionics module includes a Precision Navigation Subsystem 620, Hazard Avoidance Subsystem 625, and Processing Guidance & Control ("Guidance") subsystem 610 that will be discussed in greater detail in subsequent paragraphs. The Communication Subsystem 640 (radio transceivers and antennas), the Power Subsystem 650 (one or more batteries, solar panels, and electronics to control battery charging and power distribution), and the Thermal Control Subsystem 660 (heating and cooing systems) may be conventional and similar to subsystems employed in previous space vehicles and landers. All of the subsystems operate under supervision of Guidance Subsystem 610. Note that the defined subsystems are functional elements that may not correspond to separate and unique physical element. In particular, the hardware that constitutes the Guidance Subsystem may also perform processing tasks for other subsystems.

As shown in FIG. 8, the Precision Navigation Subsystem 620 may be comprised of a radar altimeter 720, an Inertial Measurement Unit (IMU) 740, a star tracker 730 and a Terrain Image Correlator 710. The ability to land precisely and autonomously on a safe target site surrounded by hazardous terrain is critically important for future space exploration missions. In the absence of conventional terrestrial navigation systems such as GPS, Terrain Image Correlation is the preferred navigation system for approach and landing. During approach, terrain image correlation over a large search area can reduce navigation uncertainty. For landing site acquisition, area correlation increases the probability of correct site identification, allowing a high confidence terminal approach maneuver. While landing, correlation provides the required tracking information to enable precise approach to the selected site.

A preferred Terrain Image Correlation navigation system is the DSMAC system used in the Tomahawk cruise missile to provide highly accurate position information through optical image matching algorithms since the 1970s. DSMAC is a combined camera and image processor that determines the position of the platform using an optical sensor while flying over a pre-selected mission scene. The DSMAC sensor acquires a sequence of real-time images over the pre-planned mission scene, and correlates these images with the stored reference map. Strong peak responses from multiple images and sub-pixel interpolation allow excellent position accuracy based on the reference image resolution. Each image is processed and enhanced for comparison with the reference map which has been similarly enhanced for improved correlation performance using the components and flow shown in FIG. 9. Accuracy of the DSMAC system is limited by the resolution of the reference map, range of the camera, and the accuracy of the Inertial Measurement Unit (IMU), which can meet meter level accuracy.

The DSMAC sensor 710 is comprised of optics 800 and a video sensor 805 designed for a wide field of view appropriate for the Tomahawk cruise missile. The optics can be adapted as needed to the Lander application to receive optical energy 810 from a scene 815 on the planet's surface. An illuminator (not shown in FIG. 9) is a standard, though separate component, of the DSMAC system which may or may not be required for the Lander mission. If used, the illuminator would allow for night precision navigation and would allow imagery of a landing zone within a shadowed region. Non-uniformity correction 820 is applied and an image histogram 825 is computed. Dynamic range control 830 in response to the image histogram is performed on video sensor 805. The sensed image is rotated 835 based on orientation and altitude information provided by other elements of the Precision Navigation Subsystem 620 and scaled 840 to reduce the rotated sensed image resolution to match the reference map resolution. Optionally, the image may also be converted to binary (two-level) format if the reference maps are binarized. The rotated, scaled image of the scene is filtered with an image enhancement filter 845 and then correlated 850 with the reference map stored in reference map database 855 to determine the location of the Lander and provide a navigation update 860 to the Guidance Subsystem.

The reference map is an orthorectified gray scale image in a region en route to the desired landing site and of a sufficient size in order to accommodate any anticipated navigation and guidance errors. The reference map is generated by the mission planning team using remotely sensed reconnaissance imagery. A region with distinct randomly positioned structures is required for accurate navigation. The high resolution reconnaissance imagery is orthorectified to a nadir view of the area, converted to resolution consistent with the DSMAC sensor, and then enhanced. The reference maps may be grey scale images or binarized. The reference map with a given image resolution along with other Mission Data are downloaded onto the Lander Reference Map Database before flight. Multiple DSMAC scenes with different resolutions can be flown during a mission to update the navigation during different mission phases, such as terrain acquisition altitude and terminal descent.

Planetary pinpoint landing accuracy is enabled by utilizing the proven correlation-based recognition techniques of the DSMAC camera system during the descent phase. The Lander traverses over a pre-planned scene, acquires a sequence of real-time images and correlates these images with the reference map in order to determine the position of the Lander. The subsequent correlation surface directly produces a position update for the Lander in the target coordinate system, along with the correlation strength representing the probability of a correct position update. Lander motion during the flight is incorporated to improve the correlation peak detection over the scene by combining multiple image correlation results. Terrain correlation by the DSMAC camera system has accuracy consistent with reference map resolution, allowing the lander to navigate precisely to a chosen landing site.

Simulations have demonstrated the applicability of the DSMAC to lunar terrain as well as Martial images without any optimization for these planetary environments. The correlation capability of DSMAC for the lunar environment was determined utilizing data from the Clementine Basemap Mosaic from the NASA PDS. For a South Pole approach Lunar data at the region 5° W., 63° S. to 70° S. was investigated for a pinpoint landing update. A Clementine image of this region is utilized as a reference map with an average resolution of 100 meters/pixel. First the Clementine image was processed through the DSMAC camera model in order to produce a sequence of images mimicking the optics of the camera (electronics noise, camera signal to noise ratio and motion blur are not accounted for). Next this sequence of images was then run through the DSMAC correlation simulation to generate correlation peaks of the camera modeled images to that of the reference map. Similar simulations have been run using actual Chasma Boreale Mars Global Surveyor Mars Orbiter Camera (MGS MOC) overhead imagery in order to determine the applicability of the DSMAC to the Martial terrain images. The results demonstrate the ability of Terrain Image Correlation to allow precision navigation over either lunar or Martian terrain.

Other systems that are possible candidates for the terrain image correlator are: Laser Radar (LADAR), Light detection and ranging (LIDAR), Precision Terrain Aided Navigation (PTAN). LADAR/LIDAR is being evaluated for terrain contour matching (TERCOM). PTAN is an autonomous navigation aide that measures terrain features, correlates those terrain features to stored Digital Terrain Elevation Data (DTED) and provides precision aircraft position equal to or better than Global Positioning System (GPS). PTAN is being developed for Unmanned Aerial Vehicles (UAVs), aircraft and Tactical Tomahawk to alleviate GPS jamming.

Figure 10:
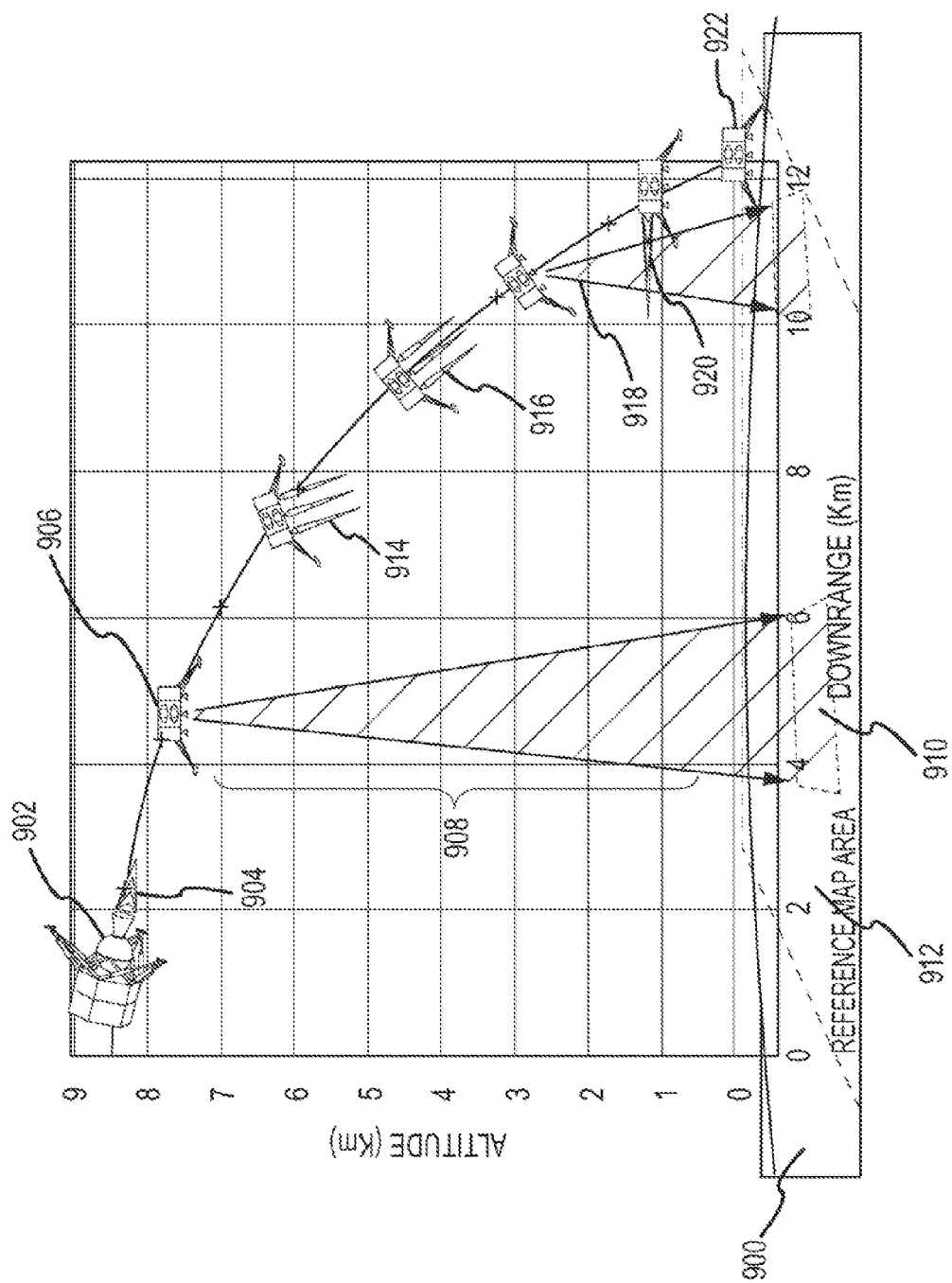
FIG. 10 is diagram of a landing sequence illustrating discrete 'divert' and 'braking' maneuvers in accordance with the present invention.

FIG. 10 illustrates a typical discrete landing sequence 16 that exploits the fuel efficiency and high T/M ratio of the EKV propulsion system and the navigation capabilities of the DSMAC. At roughly 60 seconds to landing (just prior to the 'optimum point') and about 8.5 km above the surface 900 of the planet, the braking stage 902 completes an initial velocity braking maneuver 904 (SRM burn) to reduce the lander's velocity from approximately 1800 m/s to less than 60 m/s. The braking stage 902 separates from the Lander 906 which coasts towards the surface and accelerates to about 250 m/s. During the coast period, the lander performs a DSMAC 908 to image a portion 910 of the surface and correlate it to a reference map 912 to determine a navigation update (e.g. where the lander really is in the reference map). The Guidance subsystem processes the navigation update to predict where the lander will land if no corrective action is taken. The Guidance subsystem subtracts this predicted landing site from the specified landing site designated in the reference map to estimate the unknown navigation error. The Guidance subsystem then determines the required lateral divert maneuver to get the lander back on course and issue one or more command signals to the Propulsion module to execute the lateral divert maneuver(s) 914. Using data from the radar altimeter, with about 8-15 seconds to go the Guidance Subsystem determines the required velocity braking maneuver(s) to remove substantially all of the remaining velocity and issues one or more command signals to the Propulsion module to execute the velocity braking maneuver(s) 916. The Guidance Subsystem activates the Hazard Avoidance subsystem which image 918 the surface where the Lander is going to land and modifies the navigation update if necessary to avoid any hazards. The Guidance system processes the modified navigation update and executes a divert maneuver 920 to shift the landing site and the Lander falls softly to the surface 922.

Hazard Avoidance

Hazard avoidance significantly reduces landing risk. During the descent phase, hazard detection occurs in a real time environment to eliminate the chance of a catastrophic event due to a hazard impact at the specified landing site. Hazard avoidance is also an enabling technology for an innovative mobility approach that enables a multi-kilometer powered flight, propulsive re-location, to a nearby site where additional science measurements can be repeated or taken. This new class of surface mobility can land on target sites in between hazardous terrains to reach scientifically valuable sites, to characterize resources of planetary bodies and minimize mobility requirements of a surface rover system.

Oddly enough the need for hazard avoidance can be motivated by having very high resolutions maps, inadequate low resolution maps or no maps. If there is no map or only low resolution maps of an area of scientific interest than hazards either cannot be known a priori or may be masked by the lack of resolution in which case hazard avoidance is needed to avoid unknown hazards. Conversely, high resolution maps uncover many smaller but potentially problematic hazards that would have been previously ignored. If the mission calls for a landing site populated by small hazards even if the lander accuracy is at the maximum resolution of the reference map hazard avoidance may be required.

Figure 11:
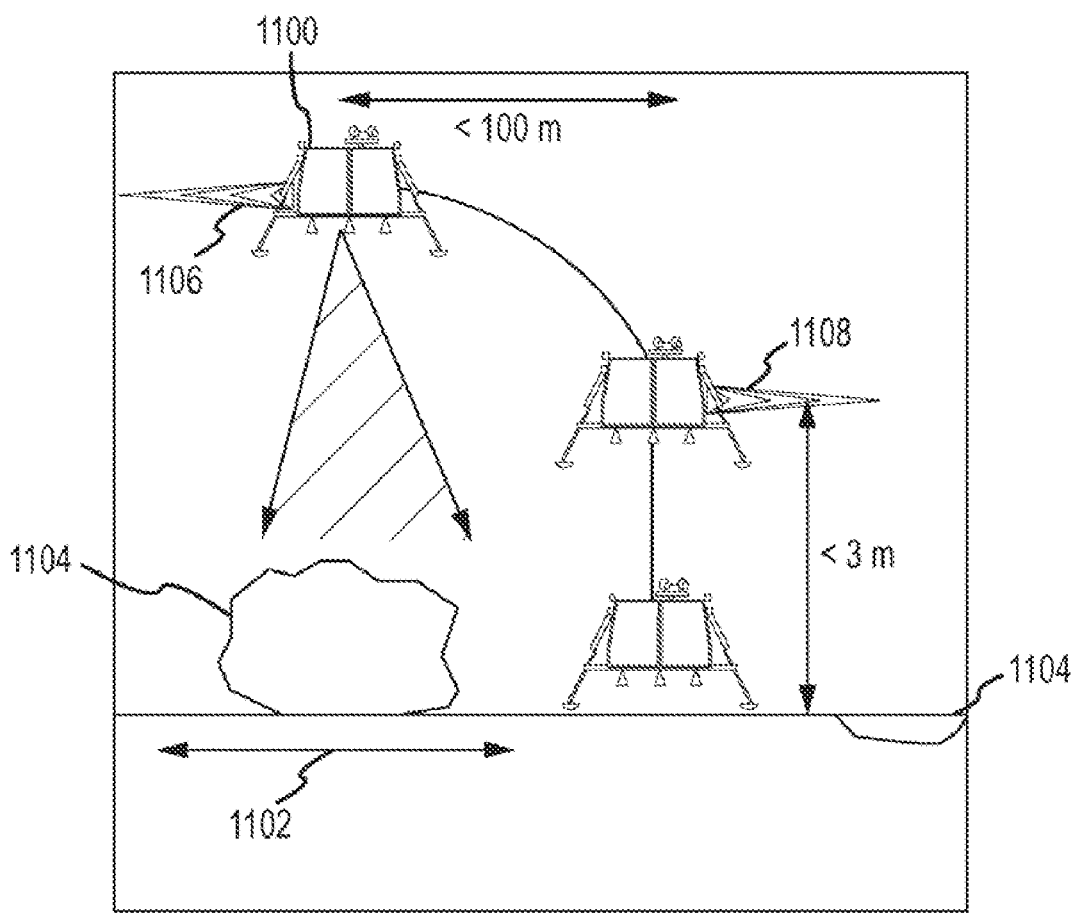
FIG. 11 is a diagram of a hazard avoidance maneuver during the landing sequence.

Hazard avoidance uses both sensors and high T/M divert and possibly lift capability of the liquid bi-propellant propulsion system. As depicted in FIG. 11, at the completion of the terminal velocity braking maneuver the Lander 1100 images the originally specified landing site 1102 to identify any surface hazards 1104 at or near the site. If a hazard is detected, the hazard avoidance system generates a navigation update and the Guidance system commands the propulsion system to perform hazard avoidance maneuvers 1106 and 1108 to divert the lander and stop it above a clear landing site where it drops the last few meters to a safe and soft landing. If necessary the lander can control the thruster to lift the lander up to a safe site. These hazard avoidance diverts consume $\Delta V<20$ m/sec typically. However, to perform hazard avoidance the Lander must have fuel margin, sensor capability and fast divert capable all of which are lacking in a conventional lander.

Figure 12:
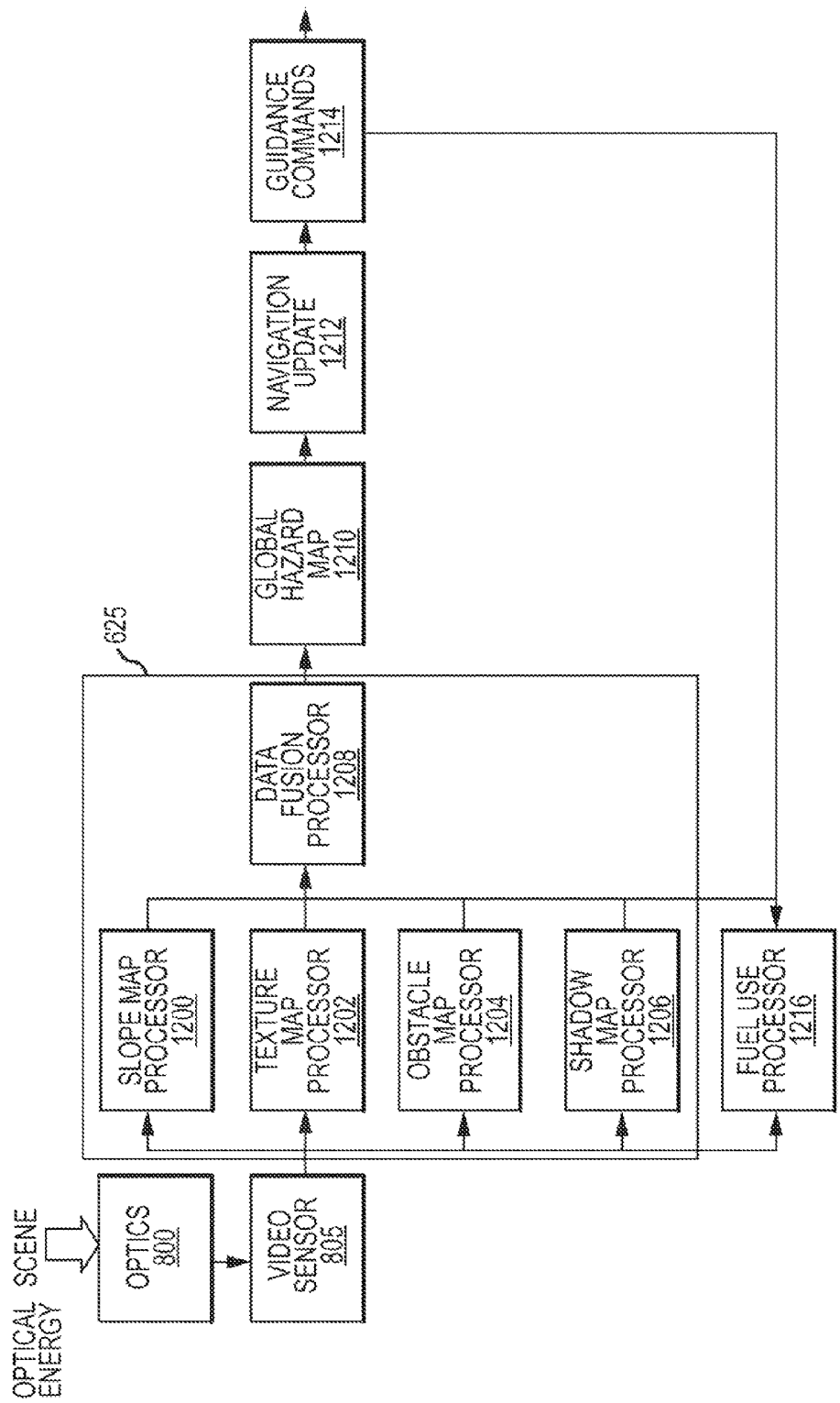
FIG. 12 is a block diagram of the hazard mapping, navigation and guidance functions required to perform hazard avoidance.

As was shown in FIG. 7, the Precision Navigation Subsystem 620, particular optics 800 and video sensor 805 (camera), works in conjunction with the Hazard Avoidance Subsystem 625 during landings. As the Lander descends, altitude information from the radar altimeter is used to provide range information and to provide scaling information for the stored image. During this time, as illustrated in FIG. 12, each image is processed by, for example, a slope map processor 1200, a texture map processor 1202, an obstacle map processor 1204, and a shadow map processor 1206 to create several hazard maps corresponding to slope, texture, shadow and obstacle information. A data fusion processor 1208 fuses the individual hazard maps to create a Global Hazard Map (GHM) 1210 which forms the basis for selection of a safe landing site. Given a specified landing site, the navigation function decides the best location to land by balancing the probability of safe landing using the GHM, the distance to the desired landing site, and residual fuel as it relates to mission requirements (i.e., being able to visit the desired number of remaining sites) and generates a navigation update 1212. The decision made by the piloting function is passed to the guidance unit which then issues guidance commands 1214 to the Lander to proceed to the updated landing site. The guidance commands are also forwarded to a fuel use processor 1216 that tracks fuel consumption.

Hazard detection and avoidance using passive imagery requires the determination of the location of hazards within the FOV of the video sensor/camera and translating that information to the guidance unit in the form of a command to guide the landing craft to a specified safe landing site. To achieve this goal, there are three distinct functions that must occur sequentially: hazard mapping; navigation; and guidance. Hazard Mapping refers to the process of analyzing terrain topography and detecting hazards through image processing algorithms, applied to the monocular optical images taken by the onboard navigation camera. Navigation refers to the concepts of data fusing, planning and decision-making used for the selection of a safe landing site. Guidance refers to the concepts used to steer the spacecraft to the landing site.

Hazard mapping is the process of assigning a hazard to each pixel of the image. This is measured in both absolute and relative terms the risk of landing at a given location. Hazard map components are slopes, textures, obstacles, and, for the sunlit regions only, shadows. Slopes, obstacles, and shadows are absolute hazard indicators, although texture is normalized to the maximum value within the region of interest. These hazard components may be combined additively or multiplicatively. In the first case, weights can be assigned to the different components and dynamically tuned as a function of the distance to the candidate landing site.

Figure 13A:
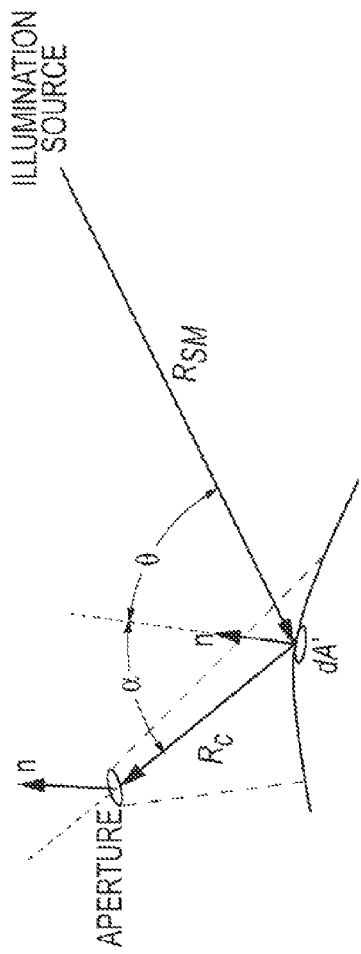
FIGS. 13a and 13b are diagrams illustrating the use of radiometrically calibrated passive imagery to produce a hazard map.

The ability to use radiometrically calibrated passive imagery to determine slope information is a standard practice requiring a derived relationship between the measured image radiance and the scene slope values. To achieve this, as shown in FIG. 13a we first assume that the scene is illuminated by a known illumination source such that each surface element dA is receiving an incident power $P_{incident}$ given by:

$$P_{incident} = I_{incident} dA \cos \theta,$$

where $I_{incident}$ is the incident irradiance and $\Theta$ is the angle between the normal of the surface element dA and the illuminating source. Assuming that the surface being illuminated is a Lambertian reflector with an albedo (fraction of energy reflected by the surface) of $f$ then the radiance emitted from a surface element dA is given by:

$$L = fP_{incident} \cos \alpha / 2\pi dA = I_{incident} \cos \theta \cos \alpha / 2\pi,$$

where $\alpha$ is the angle between the surface normal and the observation line of sight. Next we assume that the surface is being viewed by a camera with a collecting aperture $A_\alpha$, an instantaneous field of view of IFOV and is at a distance R. Under these assumptions the projected area seen by a given pixel is:

$$A_{source} = IFOV^2 R^2 / \cos \alpha$$

and the solid angle defined by the collecting aperture is given by:

$$d\Omega = A_\alpha / R^2.$$

Figure 13B:
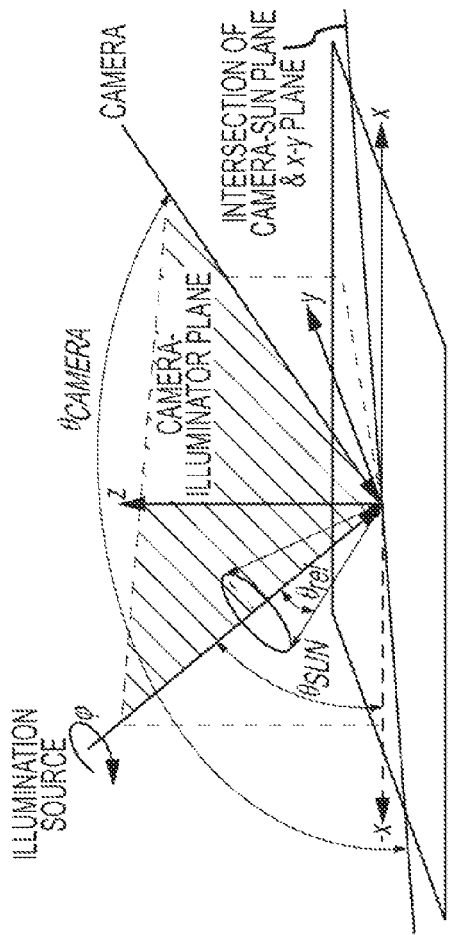

Using these relations we can obtain an expression for the power incident on a given pixel in the camera as:

$$P_{pixel} = L d\Omega A_{source} = (fI_{incident} A_\alpha IFOV^2 / 2\pi) \cos \theta = C \cos \theta,$$

where $C = fI_{incident} IFOV^2 / 2\pi$. From this expression, we can see that the power observed by each pixel is independent of the distance to the surface and independent of the viewing angle, FIG. 13a. The only dependence on the observed power is the relative angle between the illuminating source and the surface normal. Thus the illuminating source and the observer can be co-aligned if need be, which will be the case for operations in dark regions such as permanently dark craters on the Lunar South Pole. When using the above expression for slope determination one can use other constraints to define the surface slope such as the fact that the relative angle between the observer and the surface normal must be less than 90° ($\alpha<\pi/2$) to be able actually to observe the surface element, FIG. 13b.

The accuracy of this method to determine slope angles depends on several factors. Some of the factors are related to the radiometric accuracy of the sensor, the dynamic range of the sensor, and the accuracy of the assumptions related for the planetary surface having a constant albeto that behaves like a Lambertian reflector. These factors aside, there are also issues related to the functional behavior of the response function.

Since the detected power is a function of the cosine of the angle between the illuminator and the surface element normal, slope evaluation can be problematic when the angle is small. Specifically, there is a larger uncertainty in the slope angle because of the flatness of the cosine function near $\theta=0°$. For example, there is only a 6% difference between the detected power for $\theta=0°$ and 20°. This issue is addressed by the fact that the landing zone will be viewed by multiple aspect angles varying from 45° to 20° relative to the zenith. This strategy combined with the fact that a safe landing zone can have a global slope of ~30° or less provides slope maps with uncertainties well within the requirements for safe landing zone determination.

The idea behind the texture map is to be able to gauge the relative surface "roughness" of a scene using the imagery as the informational source. Given the fact that surface slope is derived from shading it is reasonable to assume that local surface roughness is obtained by the variance in the grey level value over a local patch, after the image data is corrected for responsivity. Consequently, each pixel in the scene is assigned a roughness or texture value based on the standard deviation derived within a square window centered on that pixel and normalized by the maximum standard deviation in the entire scene.

The expression describing this process is given by:

$$T_{i,j} = \left( \sum_{l=i-N/2}^{i+N/2} \sum_{m=j-N/2}^{j+N/2} (E_{l,m} - \langle E \rangle)^2 / N \sigma_{MAX} \right)^{1/2},$$

where $E_{i,j}$ represents the grey level of a given pixel, $\langle E \rangle$ is the mean grey level within the patch define by the N×N region centered on the pixel of interest and $\sigma_{MAX}$ is the maximum standard deviation over the entire scene. Since the grey levels are not associated with an absolute slope, this results in a relative roughness calculation. It is plausible to perform a roughness evaluation using the slope hazard map where the standard deviations of the slope values can be used but the texture map provides a somewhat independent evaluation of roughness an is not subject to the assumptions uncertainties used to derive the slope map.

The roughness scale information is derived from the size of the window used to calculate the standard deviation. The window (or patch) size will be optimized a priori and will change dynamically during descent as the spatial resolution of the imagery improves.

An obstacle map consists of a map of obstacle locations within the reference coordinates of the sensed image. The detection process is primarily based on image correlation of a sensed image with a bank of distortion-tolerant reference filters representing hazardous obstacles. A good match is indicated by a strong correlation peak, which provides confidence of the detection. The peak location provides a shift-invariant determination of the center of the obstacle image in the reference coordinates and is used as a measurement input for an obstacle hazard map.

The DSMAC system can be utilized for both the precision navigation and obstacle detection. As the spacecraft nears the surface, after DSMAC provides its position update information to the Processing and Control Subsystem, a new set of filters designed for obstacle avoidance is selected and utilized. This composite correlation filter technique was validated with a Mars simulation for landing area approach and to recognize ground objects as part of a landing sequence. The object model-based correlation filters detect and correctly recognize multiple hazards such as boulders and rough terrain in the landing area during a rotating descent so that a clear landing area can be determined.

Perhaps the most straight forward hazard map to generate is the shadow map. Shadows can be extracted by automatic thresholding using the image grey level histogram and graded linearly between the minimum grey level and this threshold. Mathematically this can be written as:

$$(1 - P_{i,j}) = \begin{cases} (E_{i,j} - E_{Min})/(E_{Threshold} - E_{Min}) & \text{for } E_{i,j} \leq E_{Threshold} \\ 1 & \text{for } E_{i,j} > E_{Threshold} \\ 1 & \text{for } E_{Min} \geq E_{Threshold} \end{cases}$$

were $P_{i,j}$ is the probability of encountering a hazardous landing site, $E_{i,j}$ is the grey level of the i,j$^{th}$ pixel, $E_{Min}$ is the minimum grey level in the image histogram, and $E_{Threshold}$ is a radiometrically determined threshold grey level dependent on camera integration time.

Once each individual hazard map has been generated, a global hazard map (GHM) must be generated to be used by the navigation module. Although there are several ways to combine the hazard maps, the easiest and most flexible manner in terms of performance optimization is through a weighted sum. The weighted hazard map can be generated using dynamic weights that are a function of altitude and region (sunlit versus permanently shadowed crater) allowing for the best performance. In addition, the resulting GHM will be filtered to take into consideration nearest neighbour effects to further optimize safe landing. This filtering will take into consideration the landing uncertainties associated with guidance as well as hazard location detection uncertainties. The filter will also be dynamically varied and may be performed on the individual hazard maps prior to being combined or the GHM after combination. The process for generating the GHM will be optimized through algorithm development using a set of training images.

Given the GHM, the navigation function must use the information to make a decision on the landing site selection. This decision will utilize information from a dynamically generated residual fuel map and a distance metric based on the desired landing site/zone. The residual fuel metric will include information on the required fuel need to divert to locations as a function of altitude as well as anticipated fuel requirements needed to complete the remainder of the mission. The distance metric is a measure of the relative distance away from the desired landing site/zone, which can be a linear or a nonlinear function. The distance metric is ultimately determined by considering the landing site uncertainties as they relate to the mission and scientific objectives. Therefore, the navigation module will provide the guidance unit a set of commands to land in a location based on the combination of the GHM, the residual fuel map and the relative deviation from the desired landing site.

LADAR/LIDAR can also be used for hazard avoidance. LADAR/LIDAR can provide 3-dimensional information on the potential landing area. Thus yielding slope information of the landing surface and 3-dimensional information on local hazards. Utilizing object recognition techniques such as shape base model matching hazards can be avoided.

Relocation

The ability to relocate the Lander by taking off the planet's surface, flying to another landing site and landing greatly expands the scientific measurement capability of the Lander. When employed in conjunction with Hazard Avoidance, this new class of surface mobility can land on target sites in between hazardous terrains to reach scientifically valuable sites, to characterize resources of planetary bodies and minimize mobility requirements of a surface rover system. Like Hazard Avoidance, Relocation requires that the Lander have fuel margin to lift-off, fly and land (at least 1 hop of 10 meters or more capability) and must have the high T/M ratio required for take-off, both of which are lacking in conventional landers.

Figure 14:
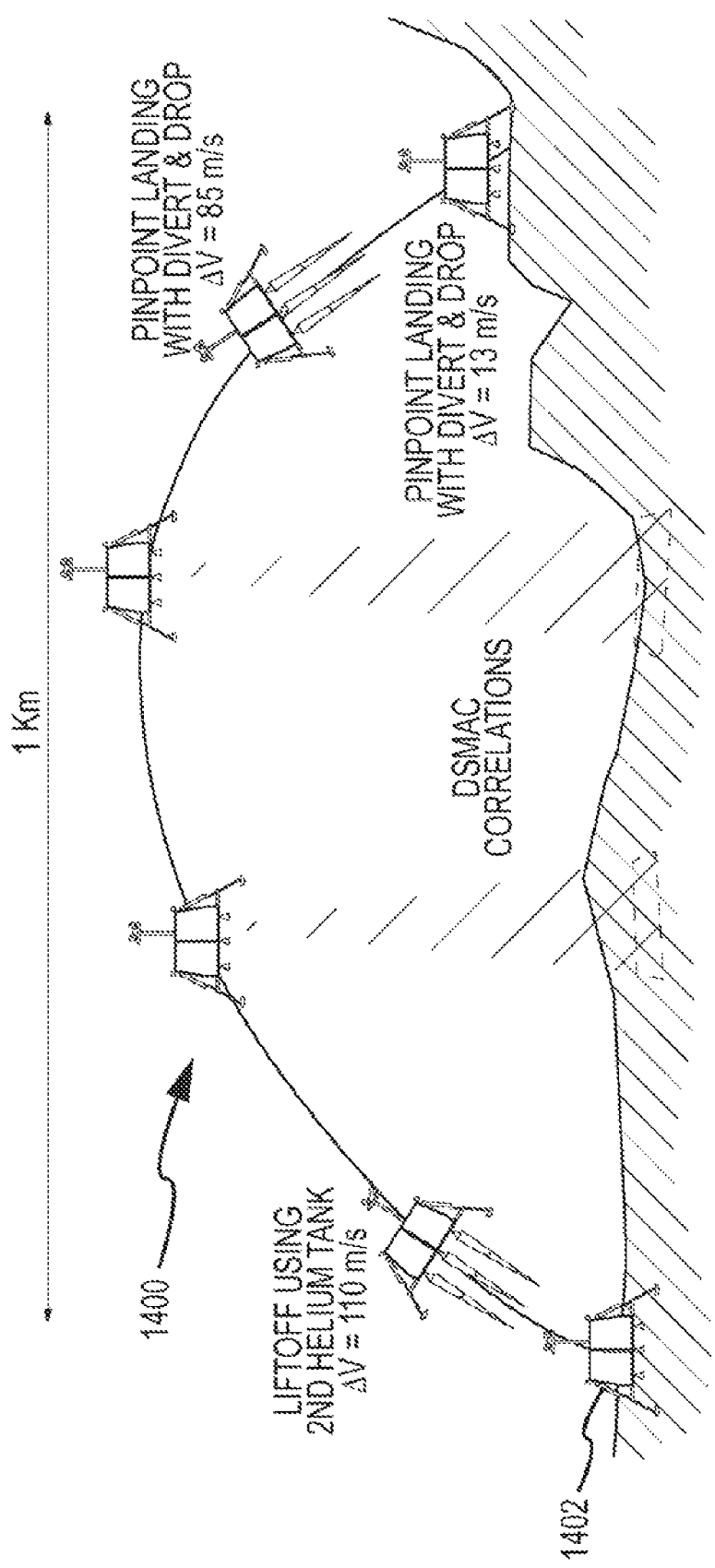
FIG. 14 is a diagram of a relocation maneuver performed after the initial landing.

FIG. 14 depicts a typical relocation hop 1400. Lander 1402 uses the second Helium tank to repressurize the fuel and oxidizer tanks to allow the propulsive thrusters to generate sufficient thrust to lift-off and fly towards the specified landing spot. As before the Lander performs DSMAC correlations and lateral divert maneuvers to correct for any cross-track divert errors. As the Lander falls back to the planet surface, the Lander performs a terminal velocity braking to remove velocity and any along-track divert errors. When the braking maneuver is complete, the Lander activates the hazard avoidance system to perform and final maneuvers prior to the drop to the surface.

At this second (or more) site, additional scientific or surface survey measurement may be performed to significantly enhance the knowledge gained form a particular mission. By comparison, the Phoenix Mars mission, which does not have this capability, will sit in one spot in a relatively hazard free area and be able to only gather samples within the range of its sampling arm (~1 m) and image the landed area with its imaging system camera to the resolution and range from the landing site.

Earth Direct Lunar Landing Sequence and $\Delta V$ Budget

Figure 15:
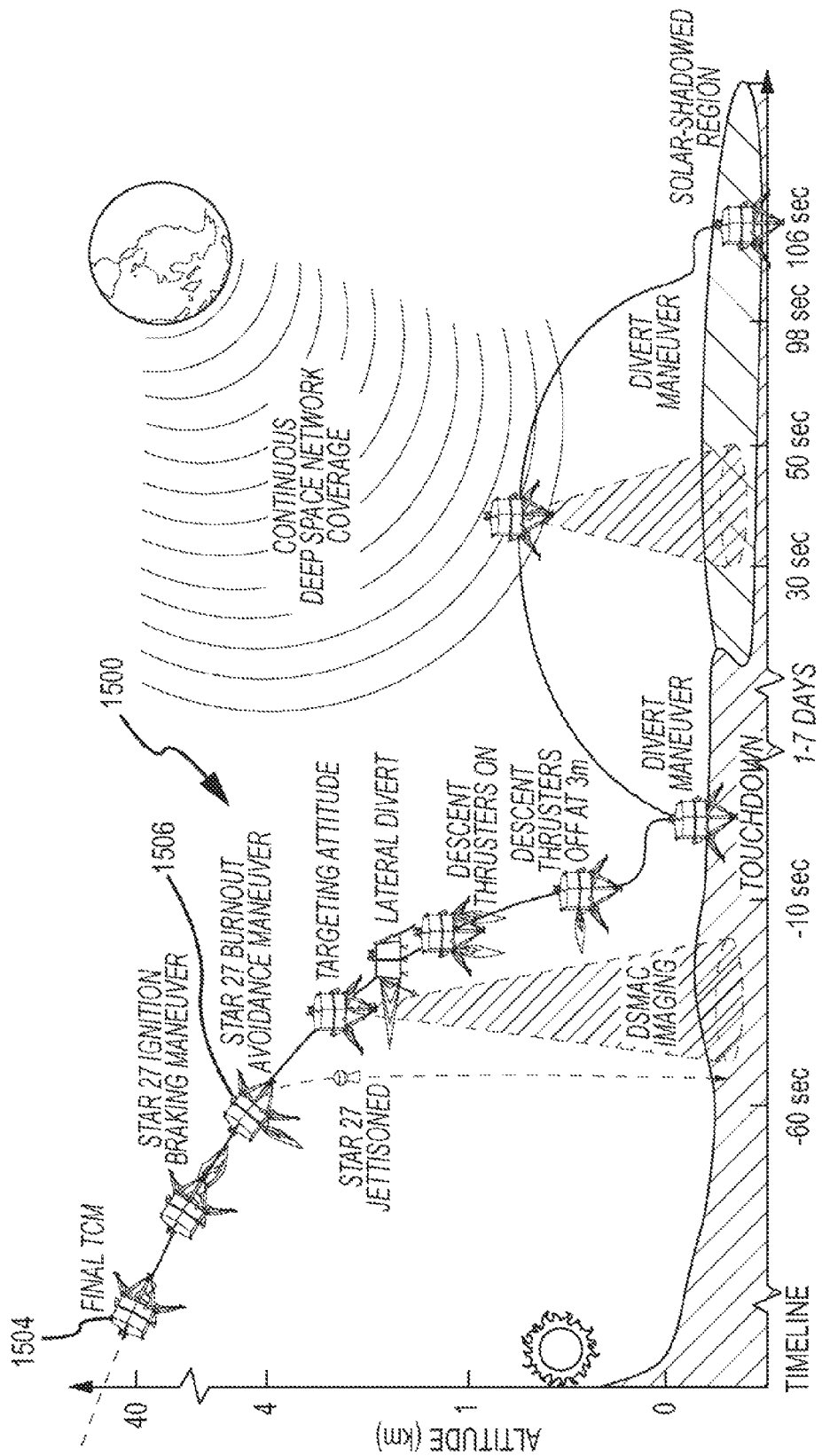
FIG. 15 is a detailed diagram of an Earth direct lunar landing sequence.
Figure 16:
FIG. 16 is a representative $\Delta V$ budget for the Earth direct lunar landing sequence.

An exemplary Earth direct lunar landing sequence 1500 and its $\Delta V$ Budget 1502 are shown in FIGS. 15 and 16. A space flight system 1504 performs a final TCM (1 m/s), performs a star 27 ignition braking maneuver (SRM burn) (2454 m/s), jettisons the Star 27 SRM and performs a Star 27 burnout avoidance maneuver and Lander despin (1 m/s). The planetary lander 1506 then performs DSMAC imaging and a mid-course lateral targeting maneuver (40 m/s). The lander coasts awhile and then turns the descent thrusters on to perform the along track targeting/velocity management maneuver (210 m/s) and turns the descent thrusters off at 3 m to go. The Lander performs a terminal lateral targeting (Hazard Avoidance) maneuver (20 m/s) and lands (landing ACS 1 m/s). The Lander may stay and perform scientific experiments at that site for 1-7 days. The Lander then performs a 'hop' which entails lift-off (22.3 m/s), re-land targeting (20 m/s), re-land velocity management (85 m/s) and re-land ACS (1 m/s). Approximately 85% of the total $\Delta V$ Budget is the SRM burn. In this particular sequence the Lander relocates to a solar shadowed region in which reference mapping may be poor or non-existent, further emphasizing the value of hazard avoidance. Of the liquid fuel budget, approximately 50% is allocated to the along track targeting/velocity management maneuver on the initial descent, 10% is allocated to the mid-course lateral targeting maneuver, 5% to hazard avoidance and 32% for a single relocation hop.

Comparative Landing Error Ellipses for Mars Landers

Figure 17:
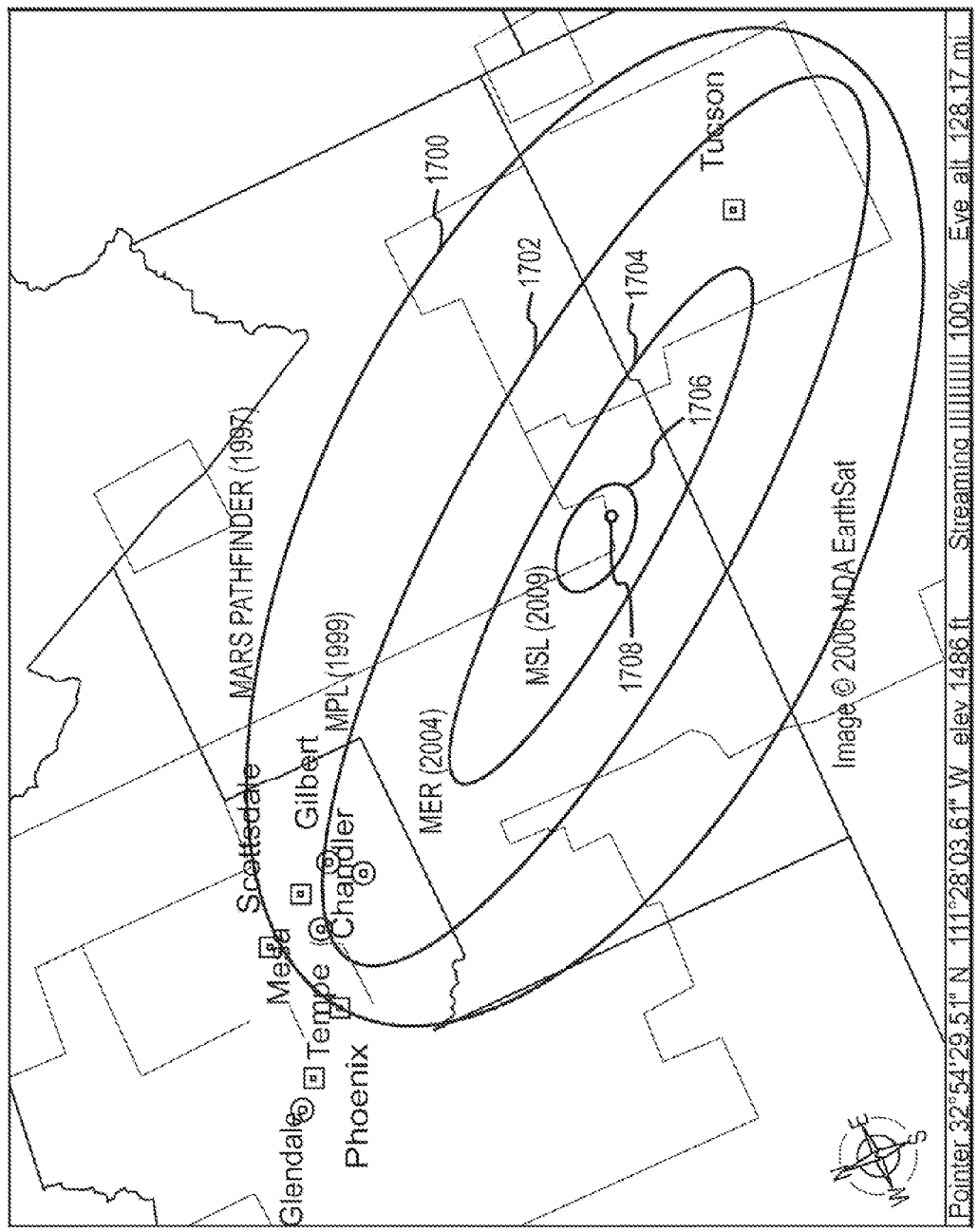
FIG. 17 is a plot of circular error probability for previous and planned conventional Mars landers and a lander in accordance with the invention.

FIG. 17 is a plot showing the landing error ellipses for past and planned Mars landers (Mars Pathfinder (1997) 1700, Mars Polar Lander (MPL) (1999) 1702, Mars Exploration Rovers (MER) (2004) 1704 and Mars Science Laboratory (MSL) (2009) 1706 using the conventional continuous-burn landing sequence compared to the landing error ellipse 1708 magnified by 100× of the Lander and discrete landing sequence of the present invention superimposed on southern Arizona, USA. The incremental improvement in the accuracy of the conventional Mars landers is not due to a change in propulsion capability or landing sequence but simply a better understand of the properties of the Mars atmosphere. The landing accuracy capability of the current Lander is dramatic when viewed in this comparison. Furthermore, the current Lander provides a higher PMF, typically 2× or more, hazard avoidance capability and relocation capability to perform at least one 1 km hop. The dramatic expansion of Lander capability and performance flows from the unique combination of hardware present in the Lander and the innovative discrete landing sequence devised to take full advantage of the Lander.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. An autonomous planetary lander, comprising:
   a soft landing impact attenuation system,
   a payload module;
   a bi-propellant propulsion module including fuel tanks for storing propellant and a set of nozzles that expel the propellant to perform velocity braking and lateral divert maneuvers, said propulsion module providing a thrust-to-mass (T/M) ratio of between 15:1 and 100:1 per nozzle, said lander having a fuel mass fraction (FMF) of less than 40% of the landed dry mass of the lander; and
   an avionics module including,
      a navigation subsystem including at least one sensor that gathers terrain data and a terrain image correlator that correlates the gathered terrain data to reference maps to provide a navigation update; and
      a guidance subsystem that processes the navigation update to estimate cross-track and along-track navigation errors with respect to a specified landing site designated in the reference map and issues discrete pulse-width modulation command signals to the propulsion module to perform at least one lateral divert maneuver while the lander is coasting to reduce the cross-track navigation error and to perform at least one velocity braking maneuver with approximately 3-15 seconds to touchdown to remove the lander velocity and reduce the along-track navigation error so that the lander lands softly on the landing attenuation system within 1 km of the specified landing site, wherein the FMF to perform the velocity braking maneuver is at most 24%.

2. The planetary lander of claim 1, wherein the PMF is between 15% to 40%.

3. The planetary lander of claim 1, wherein the T/M ratio is between 25:1 and 60:1 per nozzle.

4. The planetary lander of claim 1, wherein the guidance system performs said at least one lateral divert maneuver to reduce the cross-track navigation error to less than 10 m of the specified landing site.

5. The planetary lander of claim 1, wherein the guidance system performs said at least one lateral divert maneuver to reduce the cross-track navigation error to the maximum resolution of the reference maps.

6. The planetary lander of claim 1, wherein the guidance system performs only one velocity braking maneuver for less than 15 seconds.

7. The planetary lander of claim 1, wherein the guidance system performs multiple velocity breaking maneuvers with a total maneuver time of less than 15 seconds.

8. The planetary lander of claim 1, wherein the guidance system performs at least a first lateral divert maneuver to remove known guidance error and at least second and third lateral divert maneuvers to reduce the cross-track navigation error.

9. The planetary lander of claim 1, wherein the navigation system stores reference maps at multiple resolution levels and said sensor gathers the terrain data while coasting at a resolution that increases with proximity to the planet surface, said terrain image correlator selects the reference map whose resolution level is just lower than the sensor resolution to generate the navigation update.

10. The planetary lander of claim 1, wherein the navigation module further comprises a hazard avoidance subsystem configured to generate a hazard map from the gathered terrain data, said guidance system modifies the navigation update to reflect a new landing site if necessary to avoid a hazard, and issues a command signal to perform a hazard avoidance maneuver to move the lander towards the new landing site.

11. The planetary lander of claim 10, wherein 5-15% of the liquid fuel is reserved to perform hazard avoidance maneuvers.

12. The planetary lander of claim 10, wherein the guidance system performs the hazard avoidance maneuver with less than 15 seconds to landing with a minimum capability to divert the lander at least 50 m.

13. The planetary lander of claim 10, wherein the guidance system assesses the hazard, specified landing site, and fuel to modify the navigation update.

14. The planetary lander of claim 10, wherein the guidance system performs the hazard avoidance maneuver after the velocity braking maneuvers have removed the lander velocity.

15. The planetary lander of claim 1, wherein the guidance system is configured to issue a command signal to perform a relocation maneuver to take off, to fly the lander to a next specified landing site at least 50 m away and land.

16. The planetary lander of claim 15, wherein 20-50% of the liquid fuel is reserved to perform at least one relocation maneuver.

17. The planetary lander of claim 1, wherein 50-80% of the liquid fuel is reserved to perform the velocity braking maneuvers and 20-50% is reserved to perform the lateral divert maneuvers.

18. An autonomous planetary lander, comprising:
a soft landing impact attenuation system,
a payload module;
a bi-propellant propulsion module including fuel tanks for storing propellant and a set of nozzles configured to expel the propellant to perform velocity braking and lateral divert maneuvers, said propulsion module providing a thrust-to-mass (T/M) ratio of between 15:1 and 100:1, said lander having a fuel mass fraction (FMF) of less than 40% of the landed dry mass of the lander; and
an avionics module including,
a navigation subsystem including at least one sensor that gathers terrain data and a terrain image correlator that correlates the gathered terrain data to reference maps to provide a navigation update;
a hazard avoidance subsystem that generates a hazard map from the gathered terrain data; and
a guidance subsystem that processes the navigation update to estimate cross-track and along-track navigation errors with respect to a specified landing site designated in the reference map and issues discrete pulse-width modulation command signals to the propulsion module to perform at least one lateral divert maneuver to reduce the cross-track navigation error to less than 1 km and to perform at least one velocity braking maneuver to reduce the along-track navigation error to less than 1 km and remove the lander velocity and, if necessary to avoid a hazard, modify the navigation update to reflect a new landing site and issue another command signal to perform a hazard avoidance maneuver so that the lander lands softly on the landing attenuation system to avoid the hazard.

19. The planetary lander of claim 18, wherein the guidance system performs the hazard avoidance maneuver with less than 15 seconds to landing with a minimum capability to divert the lander at least 50 m.

20. The planetary lander of claim 18, wherein the guidance system assesses the hazard, specified landing site, and fuel to modify the navigation update.

21. The planetary lander of claim 18, wherein the guidance system performs the hazard avoidance maneuver after the velocity braking maneuvers have removed the lander velocity.

22. The planetary lander of claim 18, wherein the guidance system issues a command signal to perform a relocation maneuver to fly the lander to a next specified landing site.

23. The planetary lander of claim 22, wherein the lander budgets 40-60% of the liquid fuel to remove velocity and remove along-track navigation error, 20-40% to relocate the lander, 5-20% to remove cross-track navigation error and 5-15% to perform hazard avoidance.

24. The planetary lander of claim 18, wherein said propulsion module provides a thrust-to-mass (T/M) ratio of between 25:1 and 60:1 per nozzle.

25. An autonomous planetary lander, comprising:
a soft landing impact attenuation system,
a payload module;
a bi-propellant propulsion module including fuel tanks for storing propellant and a set of nozzles that expel the propellant to perform velocity braking and lateral divert maneuvers, said propulsion module providing a thrust-to-mass (T/M) ratio of between 15:1 and 100:1 per nozzle, said lander having a fuel mass fraction (FMF) of less than 40% of the landed dry mass of the lander; and
an avionics module including,
a navigation subsystem including at least one sensor that gathers terrain data and a terrain image correlator that correlates the gathered terrain data to reference maps to provide a navigation update; and
a guidance subsystem that processes the navigation update to estimate cross-track and along-track navigation errors with respect to a specified landing site designated in the reference map and issues discrete pulse-width modulation command signals to the propulsion module to perform at least one lateral divert maneuver to reduce the cross-track navigation error and to perform at least one velocity braking maneuver to remove the lander velocity and reduce the along-track navigation error so that the lander lands softly on the landing attenuation system within 1 km of the specified landing site,
said guidance subsequently issues discrete pulse-width modulation command signals to the propulsion system to perform a relocation maneuver to take off, fly the lander to a next specified landing site at least 50 m away and land.

26. An autonomous planetary lander, comprising:
a soft landing impact attenuation system,
a payload module, said payload having a payload mass fraction (PMF) of at least 15% of landed dry mass of the lander;
a bi-propellant propulsion module including fuel tanks for storing propellant and a set of nozzles that expel the propellant to perform velocity braking and lateral divert maneuvers, said propulsion module providing a thrust-to-mass (T/M) ratio of between 15:1 and 100:1 per nozzle, said lander having a fuel mass fraction (FMF) of less than 40% of the landed dry mass of the lander; and
an avionics module including,
a navigation subsystem including at least one sensor that gathers terrain data and a terrain image correlator that correlates the gathered terrain data to reference maps to provide a navigation update;
a hazard avoidance subsystem that generates a hazard map from the gathered terrain data; and a guidance subsystem that the navigation update to estimate cross-track and along-track navigation errors with respect to a specified landing site designated in the reference map and issues discrete pulse-width modulation command signals to the propulsion module to perform at least one lateral divert maneuver while the lander is coasting to reduce the cross-track navigation error and to perform at least one velocity braking maneuver with approximately 3-15 seconds to touchdown to remove the lander velocity and reduce the along-track navigation error so that the lander lands softly on the landing attenuation system within 1 km of the specified landing site, wherein said guidance system, if necessary to avoid a hazard, modifies the navigation update to reflect a new landing site and issues another command signal to perform a hazard avoidance maneuver so that the lander lands softly on the landing attenuation system to avoid the hazard, wherein said guidance subsequently issues discrete pulse-width modulation command signals to the propulsion system to perform a relocation maneuver to take off, fly the lander to a next specified landing site at least 50 m away and land, and wherein the lander budgets 40-60% of the liquid fuel to remove velocity and remove along-track navigation error, 5-20% to remove cross-track navigation error, 5-15% to perform hazard avoidance and 20-40% to relocate the lander.

27. An autonomous planetary lander, comprising:
a soft landing impact attenuation system,
a payload module;
a bi-propellant propulsion module including fuel tanks for storing propellant and oxidizer at pressures of at least 1,300 psi, nozzles that expel the propellant to provide radial thrust to perform lateral divert maneuvers, nozzles configured to expel the propellant to provide axial thrust to perform the velocity braking maneuvers, and valves configured to achieve a mixture ratio close to one to provide thrust-to-mass (T/M) ratio of between 15:1 and 100:1 per nozzle; and
an avionics module including,
　a navigation subsystem including at least one sensor that gathers terrain data and a terrain image correlator that correlates the gathered terrain data to reference maps to provide a navigation update; and
　a guidance subsystem that processes the navigation update to estimate cross-track and along-track navigation errors with respect to a specified landing site designated in the reference map and issues discrete pulse-width modulation command signals to the propulsion module to perform at least one lateral divert maneuver of between 10 ms and 1 second in duration while the lander is coasting to reduce the cross-track navigation error and to perform at least one velocity braking maneuver with approximately 3-15 seconds to touchdown to remove the lander velocity and reduce the along-track navigation error so that the lander lands softly on the landing attenuation system within 1 km of the specified landing site.

* * * * *